United States Patent [19]

Mikheev et al.

[11] Patent Number: 4,995,267

[45] Date of Patent: Feb. 26, 1991

[54] METHOD OF MONITORING THE STATE OF ELONGATED OBJECT AND APPARATUS FOR PERFORMING THIS METHOD

[76] Inventors: Sergei M. Mikheev, ulitsa Zelenodolskaya, 17, korpus 5, kv. 72; Valery N. Zemerov, prospekt Vernadskogo, 67, kv. 16; Petr V. Elshansky, Volzhsky bulvar, 6, korpus 1, kv. 17, all of Moscow, U.S.S.R.

[21] Appl. No.: 299,832

[22] PCT Filed: Apr. 14, 1988

[86] PCT No.: PCT/SU88/00082

§ 371 Date: Jan. 5, 1989

§ 102(e) Date: Jan. 5, 1989

[87] PCT Pub. No.: WO88/08331

PCT Pub. Date: Nov. 3, 1988

[30] Foreign Application Priority Data

May 5, 1987 [SU] U.S.S.R. .............................. 4232328

[51] Int. Cl.[5] ............................................. G01L 1/24
[52] U.S. Cl. ..................................................... 73/800
[58] Field of Search ................ 73/865.9, 73, 800, 760, 73/700, 32 R, 800; 374/187; 250/231 R; 350/43, 32

[56] References Cited

U.S. PATENT DOCUMENTS

| 4,459,022 | 7/1984 | Morey | 356/152 |
| 4,820,045 | 4/1989 | Boisde et al. | 356/319 |

FOREIGN PATENT DOCUMENTS

| 2134657 | 5/1974 | Fed. Rep. of Germany . |
| 2543377 | 4/1977 | Fed. Rep. of Germany . |
| 2507768 | 11/1980 | France . |
| 608098 | 12/1978 | Switzerland . |
| 1232943 | 5/1986 | U.S.S.R. . |
| 1293348 | 10/1972 | United Kingdom . |

OTHER PUBLICATIONS

Kapany et al., "Fiber Optics. XII. A Technique for Launching an Arbitrary Mode on an Optical Dielectric Waveguide", Journal of the Optical Society of America, vol. 60, No. 9, Sep. 1970.

Schroder, "Position Measuring System for Offshore Installations", AEG.

Primary Examiner—Robert R. Raevis
Attorney, Agent, or Firm—Burgess, Ryan and Wayne

[57] ABSTRACT

The method of monitoring the state of an elongated object resides in the synthesis of the characteristics of an extended line (3) of transmission of wave energy, providing for employing said line (3) as a space-distributed responsive element and also as the channel transmitting information on variation of a monitored parameter of an elongated object (1). By situating said line (3) in the zone of monitoring the elongated object (1), shaping in said line (3) a reference signal of a predetermined space- and time-related pattern, and obtaining a measurement signal, the processing of these signals yields continuous distribution of the monitored parameter and a capacity of evaluating the state of the elongated object (1). The apparatus for monitoring the state of an elongated object comprises a series connection of a source (21) of modulated wave energy, a first spatial filter (23), the extended line (3) of transmission of wave energy, a second spatial filter (27), a data processing unit (22) and a video display terminal (31). The extended line (3) of transmission of wave energy is a multimode waveguide with a reference channel (13) and a measurement channel (1, 4), said channels being interactingly coupled.

8 Claims, 8 Drawing Sheets

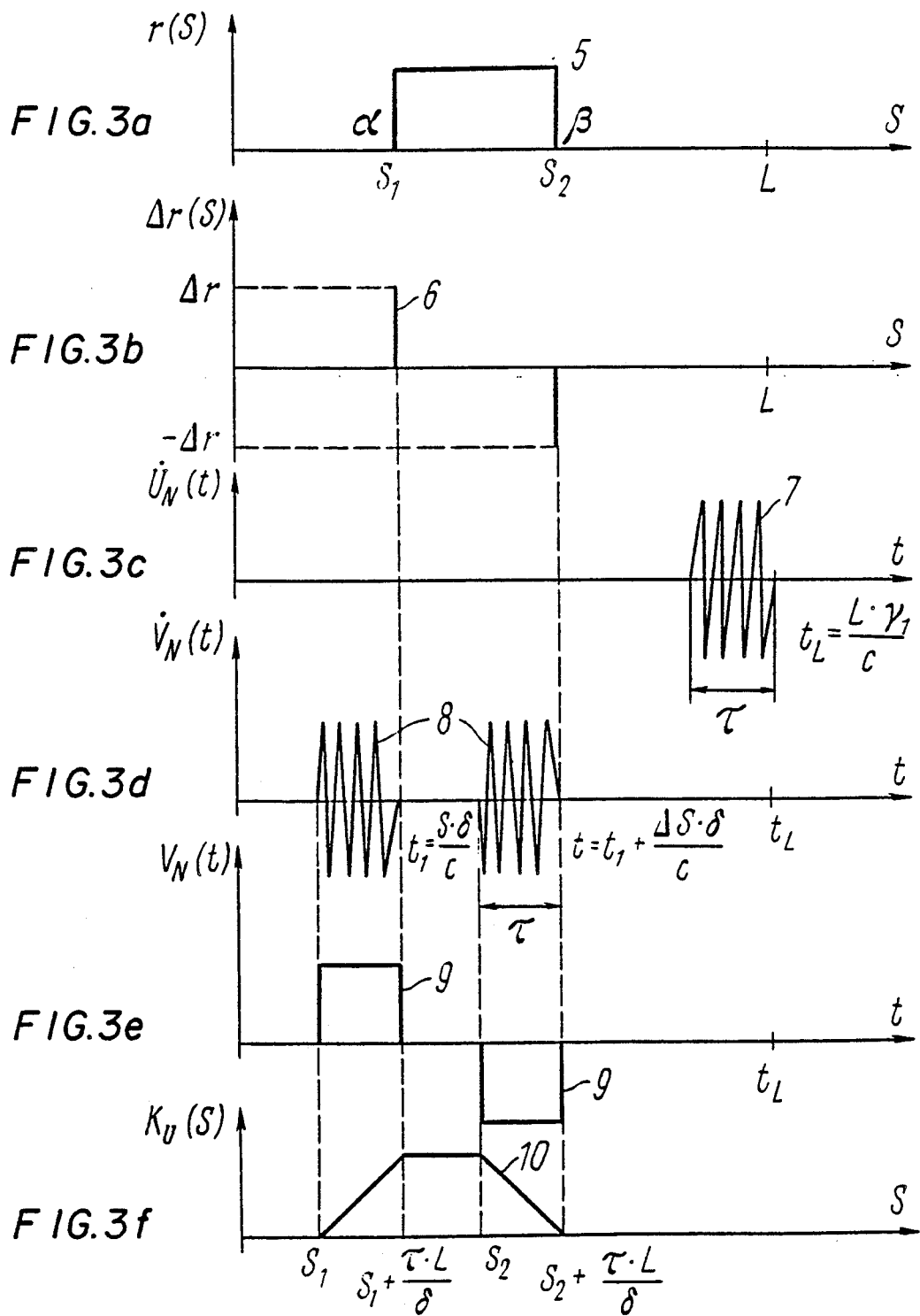

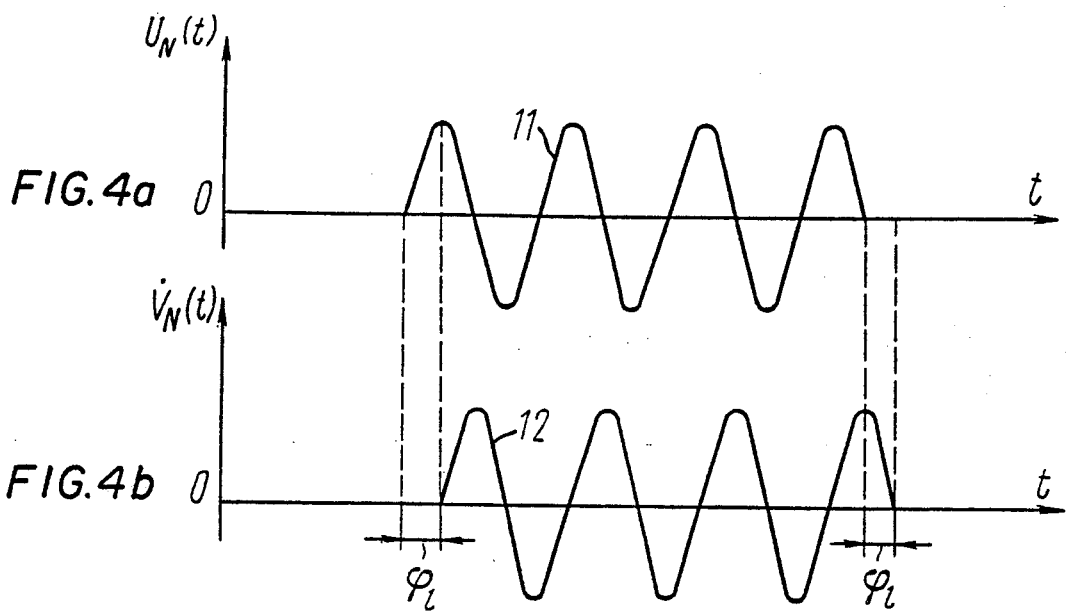
FIG. 4a
FIG. 4b
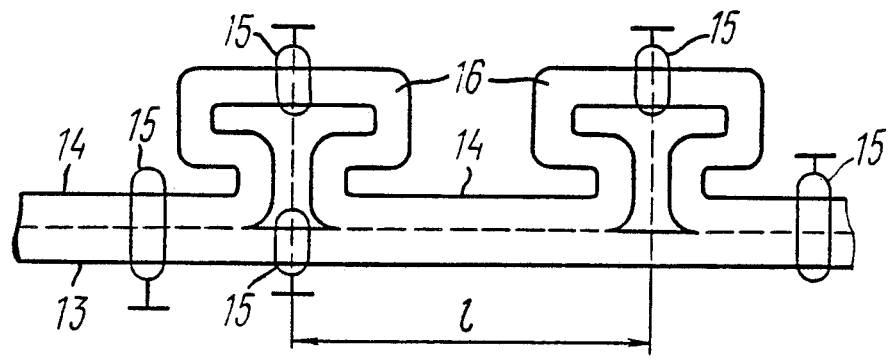
FIG. 5
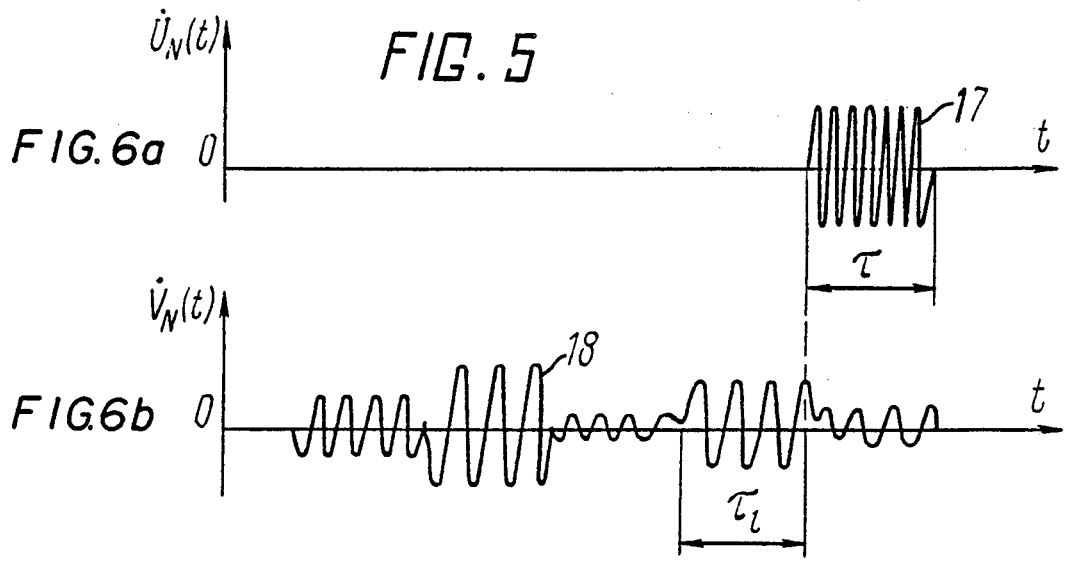
FIG. 6a
FIG. 6b

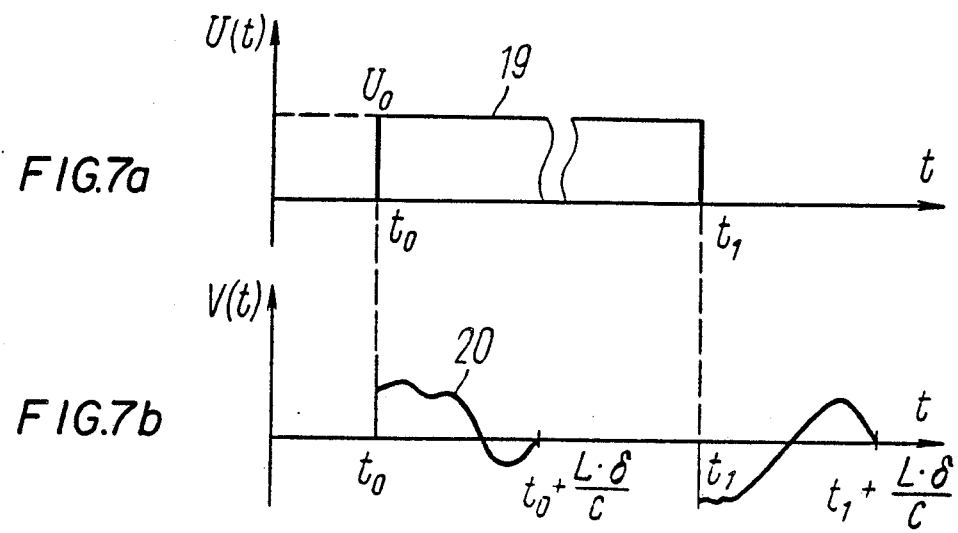
FIG.7a
FIG.7b
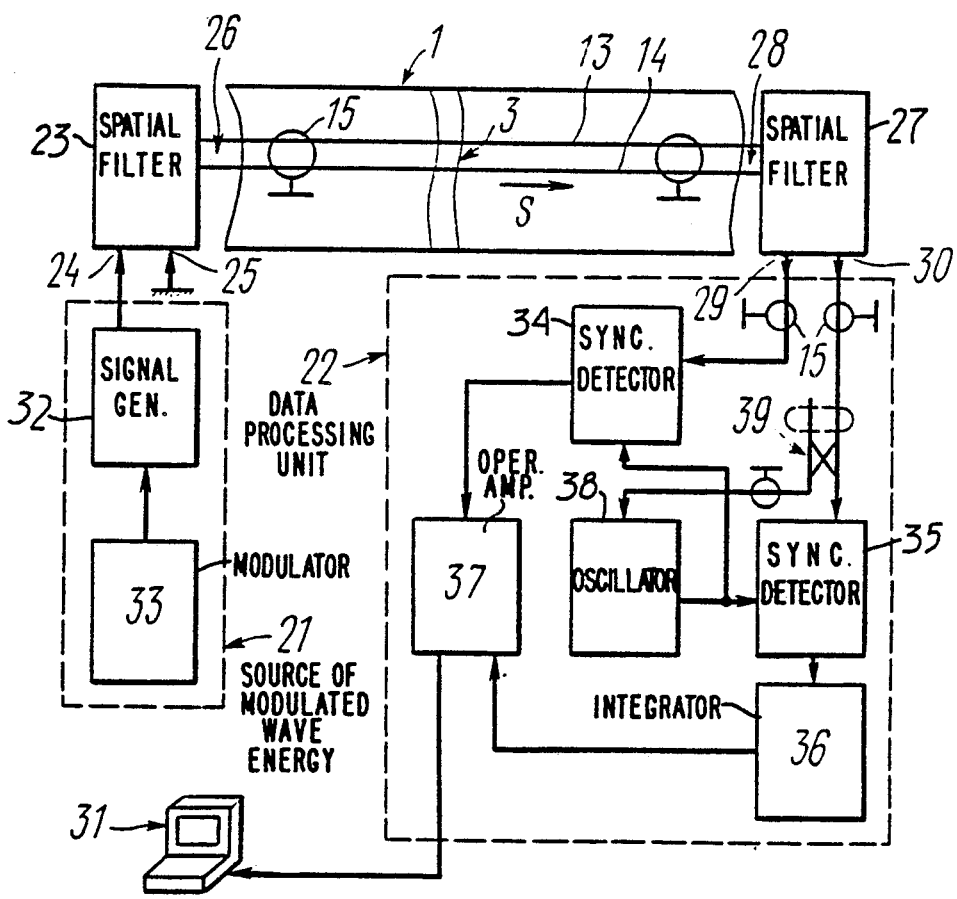
FIG. 8

METHOD OF MONITORING THE STATE OF ELONGATED OBJECT AND APPARATUS FOR PERFORMING THIS METHOD

TECHNICAL FIELD

The present invention relates to monitoring and measurement instrumentation and, more particularly, to methods of monitoring the state of elongated objects. The expression "elongated objects" is understood in the present disclosure in the broadest sense, including solid bodies, liquid and gaseous media, and their combinations, of which the physical and mechanical characteristics are to be monitored along a preset coordinate axis.

BACKGROUND ART

There is known a holographic method of monitoring the state of an elongated object (D. I. Mirovitski et al. "Mikrovolnovaya optika i golografiya", 1983, Nauka/Moscow/, pp.179, 202–206), comprising the steps of irradiating the surface of an object being monitored from a reference source of light, and subsequently registering, on a photosensitive material, the reference signal and the signal reflected by the surface of the monitored object, thus producing on the photosensitive material an interference pattern. The material and light source are placed in advance in the zone of monitoring. Following the fixation of the interference picture on the photosensitive material, a three-dimensional image of the monitored object is reproduced by irradiating the exposed material from the same light source.

There is also known an endoscopic method of monitoring the state of an elongated object (D. I. Mirovitski et al. "Mikrovolnovaya optika i golografiya", 1983, Nauka/Moscow/, p.215), comprising the main operations of the abovedescribed holographic method, plus an operation, following the fixation of the interference pattern on the photosensitive material, of transmitting this pattern via light guides for further processing the reproduction of the three-dimensional image of the monitored object.

The holographic and endoscopic monitoring methods can be performed by the known apparatus for monitoring the state of an elongated object (D. I. Mirovitski et al. "Mikrovolnovaya optika i golografiya", 1983, Nauka/Moscow/, pp. 205–206, 215), comprising a reference source of light and a photosensitive material so arranged in the zone of monitoring that the signal reflected by the surface of the object should strike the photosensitive material, and also light guides for conveying the interference pattern and a unit for processing the pattern for reproducing a three-dimensional image of the monitored object.

The holographic and endoscopic methods of monitoring the state of elongated objects, and the apparatus capable of performing these methods are distinguished by the following (D. I. Mirovitski et al. "Mikrovolnovaya optika i golografiya", 1983, Nauka/Moscow/, p.221). They are operable for monitoring objects of a length not exceeding several tens of centimeters, because when the length of an object exceeds 1 meter the reference light source and the photosensitive material should be movable along the object. This, however, substantially impairs the accuracy of fixation of the interference pattern, and, hence, the accuracy of measurement of the geometry of the reproduced three-dimensional image of the monitored object. Moreover, these methods and apparatus are suitable exclusively for monitoring the geometry of the surface of an objects, which drastically limits the capability of monitoring other variables and parameters.

The closest prior art of the disclosed solution by its technical essence is the method of monitoring the state of an elongated object, implemented for monitoring the geometry of marine risers in offshore drilling (AEG-Telefunken, BRD, "Position Measuring System for Offshore Installations. System design and mathematical description", 1980, 10 pp). The known method comprises the steps of selecting an element responsive to variation of the variable or parameter being monitored as representative of the state of the elongated object, selecting an extended line of transmission of wave energy carrying information on the variation of the monitored variable as representative of the state of the monitored object, matching the selected responsive element and extended line of transmission of wave energy, positioning the matched responsive element and extended line of transmission of wave energy in the zone of monitoring along a predetermined coordinate axis, along which the variable being controlled tends to vary, as representative of the state of the object being monitored, shaping and feeding to the input of the extended line of transmission of wave energy a time-modulated reference signal transformable as it propagates along the line in accordance with variation of the variable being monitored as representative of the state of the monitored object, measuring the parameters of the transformed reference signal at the output of the extended line of transmission of wave energy, and using the measured parameters of the transformed reference signal to determine the physical and mechanical characteristics of the state of the object being monitored along the predetermined coordinate axis of variation of the monitored variable. To be more specific, the operations of this method of prior art are implemented in the technique òffered by AEG-Telefunken in the following manner.

For the monitored variables characterizing the state of the object being monitored—a marine riser, the technique of the prior art takes the angle of deviation of the axis of the riser from a vertical line, and twist angles in a horizontal plane at the top and bottom parts of the riser. Therefore, the selection of the responsive elements is carried out by providing specific sensors responsive to a variation of the said angles, i.e. of inertia inclinometers and magnetic compasses. This is followed by selecting the extended line of transmission of wave energy in the form of a shielded electric cable in a polyethylene protective sheating. The selected responsive elements and cable are matched by establishing induction coupling therebetween. The matched sensors and cable are positioned along the predetermined axis, i.e. along the generatrix of the marine riser, along which the angles being measured are presumed to vary. To obtain sufficient data on the geometry of the selected axis in a tree-dimensional space, the sensors of deviation of the axis from a vertical line are positioned and fixed along two orthogonal generatrices on the surface of the riser. Then a reference electric signal which is time-varying at a 400 Hz frequency is fed to the input of the cable. As the signal propagates along the cable, the induction coupling provides for supplying the sensors and obtaining from them the data on the angles of interest, but at a higher frequency than the carrier frequency of 400 Hz. The parameters of the transformed electric reference signals are measured at the output of the cable, the information is decoded, and the data on the angles of twist and deviation of the axis of the riser from the vertical line are interpreted as the physical and mechanical characteristics of the state of the riser from the distribution of the curvature and twist axially of the riser. The characteristics obtained determine unambiguously the strained state of the marine riser and the relative positions in space of its extreme points for dynamic positioning.

As far as the claimed apparatus of the presently disclosed technical solution is concerned, its closest prior art by the technical essence is the apparatus for monitoring the state of an elongated object, e.g. a marine riser in offshore drilling (AEG-Telefunken, BRD, "Position Measuring System for Offshore Installations. System design and mathematical description", 1980, 10 pp), comprising a source of modulated wave energy adapted to shape a time-varying reference signal, an extended line of transmission of wave energy, extending in the zone of monitoring the elongated object along a predetermined coordinate axis and being adapted for capturing and transmitting the data on variation of a variable being monitored, connected with the output of the source of modulated wave energy, a data processing unit adapted for extracting from the extended line of transmission of wave energy the reference signal transformed by this line and for determining the physical and mechanical characteristics of the state of th the elongated object, connected with the extended line of transmission of wave energy, and a video terminal adapted for presentation of the obtained physical and mechanical characteristics of the elongated object, having its input connected to the output of the data processing unit.

In the apparatus of the prior art, the source of modulated wave energy is in the form of a 400 Hz generator. The electric cable serves both for supplying the sensors, positioned on the surface of the marine riser and for data transmission. For this purpose, the cable extends along the entire marine riser, its inner conductors being connected to the said generator and to a high-frequency (33-42 kHz) source of time-modulated oscillations required for interrogating the sensors. The cable has also connected to it the data processing unit in the form of a central station intended for extracting from the output of the cable the data supplied by the sensors and for converting them to a form susceptible to processing. The data processed by this station is sent for presentation onto the video terminal, i.e. onto a CRT display screen as the characteristics of the actual geometry of the axial line of the marine riser.

The following inherent disadvantages of the prior art method and apparatus for monitoring the state of an elongated object limit their applicability.

The said method and apparatus are unsuitable for monitoring elongated objects (e.g. structures) with high resolution and at considerable distances from the structure, on account of the limited information capacity of the line of transmission of wave energy, with the reliability of data transmission along the line being impaired with its length increasing, and the disturbance and voltage loss along this line growing accordingly. The employment of discretely positioned responsive elements in the form of angle sensors opposes in principle any continuous measurement of the distribution of a variable or parameter being monitored. It is possible only to approximate the distribution of the variable from the discretely obtained measurements along the predetermined coordinate axis, i.e. of the deviation angles axially of the marine riser from its strictly vertical position. Thus, the method and apparatus of the prior art are incapable in principle of providing for monitoring time- and -space continuous physical and mechanical characteristics of elongated objects, i.e. the curvature and axial twist of the riser, which results in approximation errors. Furthermore, the overall monitoring accuracy is also impaired by significant errors of the sensors themselves. The matching of a responsive member with the extended line of transmission of wave energy in the electromechanical manner through induction coupling and the specific fastening of the responsive elements to this line involves the positioning of sensors which are different in their operating principle, with a correspondingly complicated procedure of their interrogation, necessitating the provision and operation of costly underwater electronic equipment in an environment hazardous for its performance reliability.

Moreover, the employed sensors of the angle of deviation of the axis of the riser from verticality have a limited dynamic range of response to variation of the monitored angle (within 10°), which prohibits their use for monitoring marine risers under conditions of considerable strain and deformation. Neither is it possible to employ the same method and apparatus for monitoring other kinds of elongated objects, or else to enhance the resolution of the measurements and monitoring without increasing the number of the sensors and reducing their spacing. It is worth mentioning, too, that the abovedescribed apparatus of the prior art for monitoring the state of an elongated objects consumes about 2 kW of electric power.

DISCLOSURE OF THE INVENTION

This invention is to provide a method for monitoring the state of an elongated object and a device realizing this method so that to make possible remote monitoring of continuous physical and mechanical properties of this elongated object in space and time through combining the funcitons of receiving and transmitting measuring information in one extended line of wave energy transmission and, thus, eliminate the necessity for installation and interrogation of heterogenuous sensors or transducers in order to expand the zone of monitoring the state of an elongated object, types and ranges of monitored parameters and, simultaneously, improve the accuracy, speed, and resolution of measurements, and, also, reduce the consumption of power.

With these and other objects in view, the essence of the present invention resides in a method of monitoring the state of an elongated object, comprising the steps of selecting an element responsive to variation of the variable or parameter being monitored as representative of the state of the elongated object, selecting an extended line of transmission of wave energy carrying information on variation of the monitored parameter representative of the state of the monitored object, matching the selected responsive element and extended line of transmission of wave energy, positioning the matched responsive element and extended line of transmission of wave energy in the zone of monitoring along a predetermined coordinate axis, along which the parameter being monitored tends to vary, as representative of the state of the object being monitored, shaping and feeding to the input of the extended line of transmission of wave energy a time-modulated reference signal transformable as it propagates along the line in accordance with variation of the parameter being monitored as representative of the state of the monitored object, measuring the parameters of the transformed reference signal at the output of the extended line of transmission of wave energy, and using the measured parameters of the transformed reference signal to determine the physical and mechanical characteristics of the state of the object being monitored along the predetermined coordinate axis of variation of the monitored parameter, which method, in accordance with the present method, includes selecting the extended line of transmission of wave energy to provide for propagation of signals therein in the form of modes with known space- and time-related pattern of the physical fields, providing in the extended line of transmission of wave energy at least one reference channel and at least one measurement channel with known deceleration of the phase velocities of the modes in each one of these channels, providing for directional interaction of the fields of the modes of the at least one reference channel and at least one measurement channel along the extended line of transmission of wave energy in dependence on variation of the parameter being monitored, for obtaining in the measurement channel a signal varying in the course of propagation of a signal in the reference channel in accordance with variation of the parameter being monitored as representative of the state of the monitored elongated object, the time-modulated reference signal being shaped as time-modulated oscillation of the physical fields and the oscillation being converted into a signal with the predetermined spatial structure; converting the fields of the modes at the outputs of the at least one reference channel and at least one measurement channel of the extended line of transmission of wave energy into electric signals which are exclusively time-dependent, for determining the physical and mechanical characteristics of the state of the elongated object along the predetermined coordinate axis along which the parameter being monitored varies, extracting the amplitude of the electric signal at the output of the reference channel, amplifying the electric signal at the output of the measurement channel in inverse proportion to the value of the amplitude of the electric signal at the output of the reference channel, and employing linear scale transformation to relate the value of the differential of deceleration of the phase velocities of the modes of the reference and measurement channels of the extended line of transmission of wave energy to the current time of monitoring and to the count of the value of the coordinate along the extended line of transmission of wave energy.

It is expedient to select the extended line of transmission of wave energy, which should provide for propagation therein of modes of either acoustic, or electromagnetic, or optical fields in the respective wavebands.

It is expedient, in order to extend the dynamic range of measurement of variation of the parameter being monitored into the area of its minimum values, to provide in the extended line of transmission of wave energy at least one reference channel and at least one measurement channel with the same deceleration of the phase velocities of the modes, to divide the extended line of transmission of wave energy lengthwise into successive portions, with constant delay of the signal in one of the channels being introduced between the adjacent portions, and to measure the integral value of the variable being monitored at selected portions.

In order to ensure directional interaction of the fields of the modes of the at least one reference channel and at least one measurement channel lengthwise of the extended line of transmission of wave energy for measuring the distribution of the parameter being monitored, it is expedient that the at least one measurement channel should have its either magnetic permeability, or dielectric permittivity, of acoustic density, or optical density functionally dependent on variation of the value of the parameter being monitored.

It is expedient to employ as the parameter being monitored either temperature, or pressure, or humidity, or density, or salinity, or various combinations thereof.

With the abovestated objects in view, the present invention further resides in an apparatus for monitoring the state of an elongated object, comprising a source of modulated wave energy adapted to shape a time-varying reference signal, an extended line of transmission of wave energy, extending in the zone of monitoring the elongated object along a predetermined coordinate axis and being adapted for capturing and transmitting information on variation of a parameter being monitored, connected with the output of the source of modulated wave energy, a data processing unit adapted for extracting from the extended line of transmission of wave energy the reference signal transformed by this line and for determining the physical and mechanical characteristics of the state of the elongated object, connected with the extended line of transmission of wave energy, and a video terminal adapted for presentation of the obtained physical and mechanical characteristics of the elongated object, having its input connected to the output of the processing unit, in which apparatus, in accordance with the present invention, the extended line of transmission of wave energy includes a multimode waveguide with at least one reference channel and at least one measurement channel of which the coupling is dependent on variation of the parameter being monitored, the source of modulated wave energy including a series connection of a modulator and a generator of wave energy of physical fields, the apparatus for monitoring the state of the elongated object further comprisinga first spatial filter adapted for exciting the modulated signal of the reference channel having the predetermined space- and time-related pattern of the fields of the modes, included between the output of the generator of wave energy of physical fields and the extended line of transmission of wave energy, and a second spatial filter adapted for separating in space the fields of the modes of the reference channel excited by the reference signal and the fields of the modes of the measurement channel excited due to the coupling between the channels, dependent on variation of the parameter being monitored, situated between the extended line of transmission of wave energy and the inputs of the data processing unit, the input and output of the at least one reference channel being, respectively, the first input and the first output for wave energy of the fields of the first and second spatial filters, respectively, and the input and output of the at least one measurement channel being the second input and the second output for wave energy of the fiel fields of the first and second spatial filters, respectively.

It may be expedient for the data processing unit to include the first and second synchronous detectors capable of converting the wave energy of the fields into electric signals, having their first inputs connected, respectively, with the outputs of wave energy of the fields of the second spatial filter, an integrator, an operational amplifier having its first input connected to the output of the integrator, the input of the integrator being connected to the output of the second synchronous detector, the output of the operational amplifier serving as the output of the data processing unit the second input of the operational amplifier being connected with the output of the first synchronous detector, and a heterodyne synchronizing oscillator having its output connected to the respective second inputs of the first and second synchronous detectors.

To provide for operability of the apparatus in optical or infra-red fields of wavelengths, it may be expedient for the data processing unit to include an heterodyne oscillator converter for reducing the frequency of the carrier oscillations of the wave energy, its first and second inputs serving as the inputs of the data processing unit, its outputs being connected to the respective inputs of the first and second synchronous detectors, and its third input being connected to an additional output of the synchronizing heterodyne oscillator.

The disclosed technical solution allows to perform objective monitoring of the state of a broad spectrum of elongated objects, based on continuous measurement of time- and space-related distribution of the physical and mechanical characteristics representative of the state of such objects. Unlike the hitherto known measurement and monitoring facilities, the invention provides for significantly increasing the sizes of monitored elongated objects, and with the extended line of transmission of wave energy operated in the optical range, the sizes can be as great as tens or even hundreds of kilometers. The ultimately attainable resolution of the disclosed monitoring method and apparatus along the predetermined coordinate axis is half the wavelength of the range of wave energy employed. Moreover, the disclosed method and apparatus apply no principal limitations on the dynamic range of measurement of the monitored physical and mechanical parameters or variables characterizing the state of elongated objects, which amounts to broad versatility of the proposed monitoring techniques and enhanced measurement accuracy without sacrificing the resolution. A major asset of the disclosed method of monitoring the state of an elongated object and of the apparatus performing this method is the capability of employing one and the same composite extended line of transmission of wave energy (e.g. a measurement waveguide line) for measuring a whole number of variables or parameters of different physical nature, and of their distribution. Moreover, with lines based on fibre optics, this can be done without electromagnetic interference.

BRIEF DESCRIPTION OF DRAWINGS

The invention will be further described in connection with its embodiments, with reference being made to the accompanying drawings wherein:

FIGS. 3a–3f are diagrams illustrating variations of signals in the extended line of transmission of wave energy, according to the invention;

FIGS. 4a and b present diagrams of signals in the reference and measurement channels of the extended line of transmission of wave energy in integral measurement of a variable being monitored, according to the invention;

FIG. 5 illustrates the structure of the extended line of transmission with delay loops in the measurement channel, in accordance with the invention;

FIGS. 6a and b present diagrams of signals in the extended line of transmission with delay loops in the measurement channel, in accordance with the invention;

FIGS. 7a and b present diagrams of signals illustrating the employment of a video signal in the channels of the extended line of transmission of wave energy, in accordance with the invention;

FIG. 8 is a structural block-unit diagram of an apparatus for monitoring the state of an elongated object, embodying the invention;

BEST MODE FOR CARRYING OUT THE INVENTION

Figure 1:
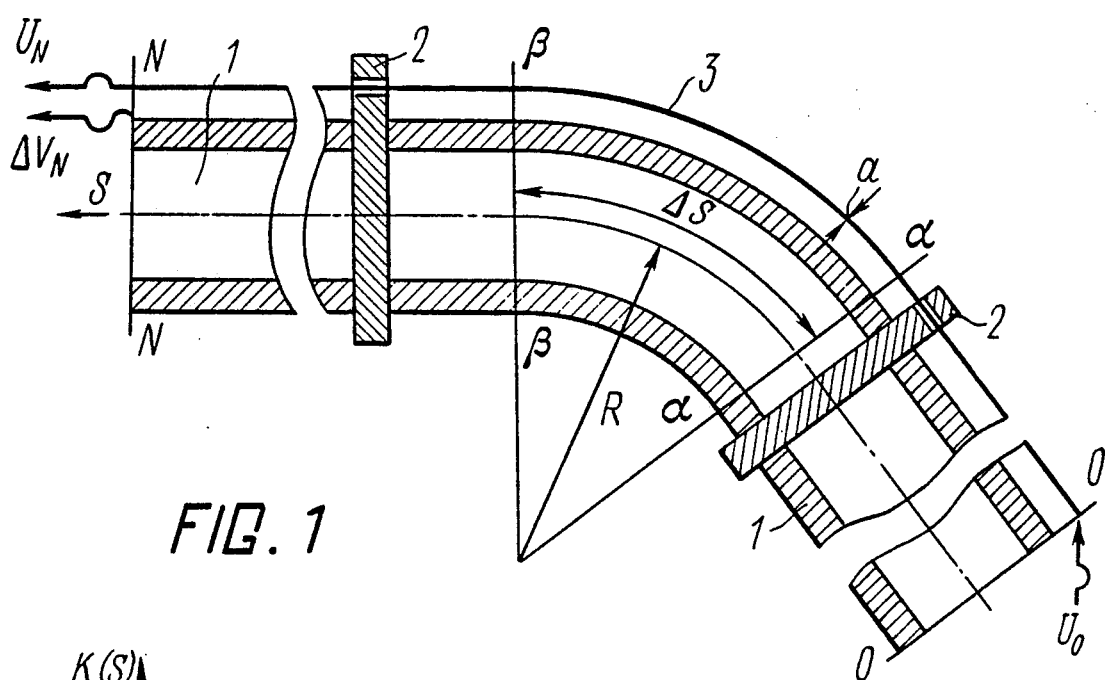
FIG. 1 shows an elongated object in the form of a curving pipeline, supporting on its surface an extended line of transmission of wave energy, according to the invention.

The following theoretical substantiation of the disclosed method of monitoring the state of an elongated object 1 (FIG. 1), e.g. of a curving pipeline, will be based on an example of using as the parameter being monitored the distribution of the curvature K of the generatrix of the cylindrical surface of this curving pipeline 1. The pipeline 1 is provided with spaced clamps 2 supporting therealong an extended line 3 of transmission of wave energy. The predetermined coordinate axis in this example is the arcuate coordinate axis S extending along the axis of the pipeline 1. Thus, in this example the distribution of the monitored parameter is the curvature function K(S). The parameter being monitored is employed to determine the physical and mechanical characteristics of the state of the pipeline 1, such as the geometry of its axial line in the plane of flexure, and from known rigidity of the pipeline 1 in flexure, the internal strain under load can be assessed.

The pipeline 1 which is accompanied by the extended line 3 of transmission of wave energy (to be hereinafter referred to as the measurement waveguide line—MWL) attached to its surface is subjected to regular flexure with a radius R at its element ΔS along the predetermined coordinate axis S. The pipeline 1 has no breaks, and its diameter is significantly greater than the transverse dimension "a" of the MWL, so that the MWL itself undergoes but small deformation at the element ΔS. In this example, the MWL is the simplest double-mode regular waveguide, with the modes interacting in flexure. In other words, in this example the extended line 3 of transmission of wave energy ensures that signals propagate therealong in the form of modes with known space- and time-related pattern of physical fields. This line 3 is suitable for propagation of either acoustic, or electromagnetic, or optical fields in the corresponding ranges of wavelengths.

In accordance with the theory of waves interrelated at small deformations of regular waveguides (R. B. Vaganov et al. "Mnogovolnovye volnovody so sluchainymi neregulyarnostyami", 1972, Sovietskoie Radio/Moscow/, p. 70), the coupling of the modes of the MWL has the directional character, the coupling coefficient "r" being directly proportional to the curvature $K=1/r$ at the element ΔS:

$$jkr\Delta S = jk\frac{a}{R} g\Delta S; \quad r = \frac{a}{R} g, \tag{1}$$

where
- r is the coupling coefficient per unit of length ΔS of the modes whose amplitudes are normalized to the power of excitation of the MWL;
- k is the wave number;
- J is the imaginary unit;
- g is a dimensionless coefficient defined by the patterns of the fields of the modes inside the MWL.

One of the transmission modes of the MWL is selected as a reference channel, and the other mode is selected as a measurement channel, with known deceleration of the phase velocities in these channels. Then, allowing for the $k=\omega/c$ expression of the wave number, the constants of propagation of the modes of the reference and measurement channels, respectively, are:

$$\gamma_{1,2} = k\beta_{1,2}, \tag{2}$$

where
- $\beta_{1,2}$ are the value of deceleration of the phase velocities of the modes, respectively, of the reference and measurement channels;
- $\omega$ is the angular frequency, and
- c is the velocity of light in vacuum.

Thus, the directional interaction along the extended line 3 of transmission of wave energy of the fields of the modes of the at least one reference channel and at least one measurement channel is made to depend on variation of the parameter K being monitored. While providing for directional interaction along the extended line 3 of transmission of wave energy of the at least one reference channel and at least one measurement channel for measuring the distribution of the parameter being monitored, the at least one measurement channel preferably has its either magnetic permeability, or dielectric permitivity, or acoustic density, or optical density functionally dependent on variation of the value of the parameter being monitored.

Figure 2:
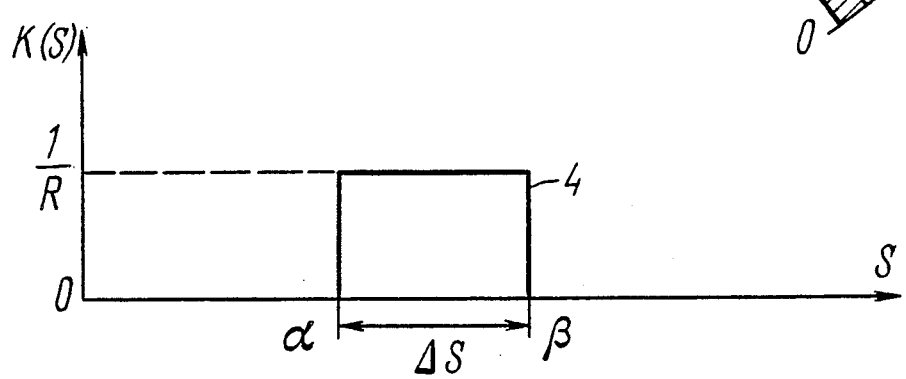
FIG. 2 is a diagram representing the pattern of curvature of the elongated object along the arcuate coordinate axis extending axially of the elongated object, according to the invention.

When a reference signal with an amplitude $U_o = U(\omega)e^{j\omega t}$ at the frequency $\omega$ is excited at the input of the MWL, at its section O—O (FIG. 1), the shaping of the modes of the measurement signal $\Delta V_N$ at the output of the MWL, i.e. at its section N—N will be discussed below. The distribution of the curvature K (plotted under numeral 4 in FIG. 2) in the region of the element ΔS is shown in FIG. 2. At the element ΔS, at its section α—α (FIG. 1), the wave of the mode of the reference signal would be $Ue^{-j\gamma_1 S}$, and at the section β—β there would appear the waves of the modes of the reference signal, scattered by the element ΔS, with the amplitude $$U_\beta = U e^{-j\gamma_1 S} \sqrt{1 - k^2 r^2 \Delta S^2},$$

and the waves of the modes of the measurement signal, respectively, with the amplitude $\Delta V_\beta = U_o kr\Delta S e^{-j\gamma_1 \Delta S}$. At the output of the MWL, at the section N—N, the reference and measurement signals, respectively, would acquire the following forms:

$$U_N = U_0 \cdot \sqrt{1 - k^2 r^2 \Delta S^2} \cdot e^{-j\gamma_1 L} \tag{3}$$

$$\Delta V_N = j \cdot U_0 \cdot \tau \cdot \Delta S \cdot e^{-j\gamma_2 L} \cdot e^{-j(\gamma_1 - \gamma_2)S}$$

where L is the full length of the MWL from section O—O to section N—N. The values $U_o$, $U_N$ and $\Delta U_N$ represent the spectrum densities of the amplitudes of the modes at the input and output of the MWL at a frequency $\omega$. Expression (3) presents the shaping of the spectrum of the measurement signal $\Delta V_N(\omega)$ at the output of the MWL from the spectrum of the reference signal. At the portion from the section O—O to the section α—α of a length S (FIG. 1), there takes place the transmission of the reference signal with a delay factor $e^{-j\gamma_1 S}$, and at the portion from the section α—α to the section β—β at the element ΔS, there takes place redistribution of a part of the energy of this spectrum into the spectrum of the measurement signal $V(j\omega)$, and transmission of this signal to the output of the MWL with a delay factor $e^{-j\gamma_2(L-S)}$.

The above described process takes place at each element ΔS of the MWL.

Accounting for the addition of the signals from each element ΔS, at the section N—N the full spectrum of the measurement signal $V_N(\omega)$ at the output of the MWL, subjected to flexure with curvature distribution $K(S)$ allowing for the sign and $\delta = \beta_1 - \beta_2$ would equal the sum of the partial spectra $\Delta V_i(\omega)$, ultimately expressed as an integral:

$$V_N(\omega) = \lim_{\substack{\Delta S \to 0 \\ N \to \infty}} \sum_{i=0}^{N} \Delta V_i(\omega) = \tag{4}$$

$$U(\omega) \cdot e^{-j\gamma_1 L} \cdot j\frac{\omega}{c} a \cdot g \int_0^L K(S) e^{-j\frac{\omega}{c}\delta S} dS,$$

and the full measurement signal versus time $V_N(t)$ would be determined by Fourier transformation of $V_N(\omega)$:

$$V_N(t) = \frac{j}{2\pi} \int_{-\infty}^{+\infty} U(\omega) \frac{a \cdot \omega}{C} g \cdot \quad (5)$$

$$e^{-j\frac{\omega}{C}\beta 2L} \int_0^L K(S) e^{-j\frac{\omega\delta}{C} S} dS \cdot e^{j\omega t} d\omega =$$

$$\frac{1}{2\pi} \int_{-\infty}^{+\infty} U(\omega) \frac{a \cdot g}{\delta} \int_0^L \frac{\partial K(S)}{\partial S} e^{-j\omega\left(\frac{S}{C}\delta - t\right)} dS d\omega$$

The integral over $\omega$ in expression (5) determines the so-called "hardware measurement function" (R. N. Sedletski et al. "Voprosy sinteza radiolokatsionnykh signalov", 1970, Sovietskoie Radio/Moscow/, p. 20):

$$f(t - t_s - t_1) = \frac{1}{2\pi} \int_{-\infty}^{+\infty} U(\omega) e^{-j\omega\left[t - \frac{L \cdot \beta 2}{C} S(\beta 1 - \beta 2)\right]} d\omega, \quad (6)$$

where $$t_1 = L \frac{\partial \gamma_2}{\partial \omega} = L/V_{g2}$$

is the group delay time of the signal propagating along the measurement channel;

$t_S = (V_{g1} - V_{g2}) S/V_{g1} V_{g2}$ is the group current time of delay of the measurement signal along the MWL;

$$V_{g1,g2} = \left(\frac{\partial \gamma_{1,2}}{\partial \omega}\right)^{-1}$$

is the group velocity of the signals propagating, respectively, along the reference and measurement channels.

Providing for expression (6), the measurement signal can be determined, as follows:

$$V(t) = \frac{ag}{C} \int_0^L \frac{\partial K(S)}{\partial S} f(t - t_1(V_{g1} - V_{g2})S/(V_{g1} V_{g2}) dS = \quad (7)$$

$$\begin{cases} V(t); t \in [t_1 \div t_1 + T] \\ 0; t \quad [t_1 \div t_1 + T] \end{cases}$$

where $T = L(V_{g1} - V_{g2})/V_{g1} V_{g2}$ is the measurement time interval (i.e. the full time of the measurement signal).

Thus, in order to produce in the measurement channel a signal varying in the course of propagation of the signal through the reference channel in accordance with variation of the monitored parameter characterizing the state of the elongated object being monitored, the time-modulated reference signal is shaped as time-modulated oscillation of physical fields, and this oscillation is converted into a signal with the predetermined spacial mode field pattern, and then the fields of the modes at the outputs, respectively, of the at least one reference channel and of the at least one measurement channel of the extended line of transmission of wave energy are converted into exclusively time-dependent electric signals.

Thus, the MWL can be seen as a linear measuring instrument with the hardware function $f(t - t_1 - t_S)$. The shorter is the time interval taken by the hardware function, the finer is the resolution of the instrument. If $f(t)$ is a Dirac delta function $\delta(t - t_1 - t_S)$, then $$V(t) = \frac{ag}{c} \frac{\partial K[S(t)]}{\partial S}$$

The determination of the spatial distribution $K(S)$ is done by scale computation of the temporal function:

$$S(t) = t(V_{g1} V_{g2})(V_{g1} - V_{g2})^{-1}$$

The above considerations are intended to serve as a provisional illustration of the physical essence of the disclosed method of monitoring the state of an elongated object, from the viewpoint of analysis of general properties of signals of a space- and time-related structure, propagating through a double-mode MWL with inetracting coupled channels, when the parameter being monitored affects the MWL.

A more complete theoretical substantiation of the disclosed monitoring method, containing an analysis of the requirements put before the parameters of the MWL and the time-modulated reference signal, will be given hereinbelow using the theory of coupled waveguide transmission lines and of spectrum analysis of signals.

Each i-th portion of an MWL of a length $\Delta S_i$ represents a directional wave coupler with the coupling coefficient $r_i = \psi K_i$, where $\psi$ is the coefficient of proportionality, and $K_i$ is the value of the parameter being monitored (e.g. curvature) at the element $\Delta S_i$. Hence, the entire MWL can be seen as a chain of serially connected directional couplers. The values of the spectrum amplitudes $U_o(\omega)$, $U_N(\omega)$ and $V_N(\omega)$ are interconnected through the scattering matrix [S] of the MWL describing the transmission of waves from the input section O—O to the output section N—N:

$$\begin{bmatrix} U_N \\ V_N \end{bmatrix} = [S] \begin{bmatrix} U_0 \\ O \end{bmatrix}; [S] = \prod_{i=1}^N [S_i] \quad (8)$$

where $[S_i]$ is the scattering matrix of the i-th element of the MWL, of a length $\Delta S_i$, with $K_i$ being the value of the monitored parameter at this element;

N is the number of such elements $\Delta S_i$ over the length L;

the matrix $[S_i]$ for any double-mode MWL can be expressed as:

$$[S_i] = e^{-j\phi i[(t_i>)<t_i|} + e^{-j2\Delta S_i \sqrt{\left(\frac{\gamma_1 - \gamma_2}{2}\right)^2 + K^2 \cdot \tau_i^2}} \cdot (h_i><h_i|] \quad (9)$$

$$\phi_i = \left(\frac{\gamma_1 + \gamma_2}{2} + \sqrt{\left(\frac{\gamma_1 + \gamma_2}{2}\right)^2 + K^2 \cdot \tau_i^2}\right) \cdot \Delta S_i$$

$r_i = \psi K_i$; $<t_i|$, $<h_i|$ is a pair of orthonormalized acting eigenvectors of $[S_i]$, defined through $r_1$, as follows:

$$<t_i = \frac{1}{\sqrt{1 + th^2 \frac{X_i}{2}}} \left[ 1; th \frac{X_i}{2} \right], \quad (10)$$

$$<h_i = \frac{1}{\sqrt{1 + th^2 \frac{X_i}{2}}} \left[ th \frac{X_i}{2} ; -1 \right], \quad t_i> = \{<t_i\}^T$$

$$h_i> = \{<h_i\}^T, \quad X_i = \text{Arcsh} \frac{2\tau_i K}{(\gamma_1 - \gamma_2)} = \text{Arcsh}\left(\frac{2\tau_i}{\gamma}\right),$$

where $\{\ldots\}^T$ refers to transportation.

Using expressions (8) and (9), the matrix [S] can be expressed as a function of the frequency $\omega$:

$$[S(\omega)] = \quad (11)$$

$$e^{-j\phi} \prod_{i=1}^{N} [(t_i><t_i) + e^{-\frac{j2\Delta S_i \omega}{C}} \sqrt{\left(\frac{\delta}{2}\right)^2 + \tau_i^2} \cdot (h_i><h_i)]$$

where $\phi = \sum_{i=1}^{N} \phi_i$

The time-related connection of the signals $U_n(t)$, $V_N(t)$ at the output of the MWL with the signal $U_o(t)$ at its input can be defined through the spectrum of the input signal $U_o(\omega)$ and the matrix [S]:

$$\begin{bmatrix} U_N(t) \\ V_N(t) \end{bmatrix} = \frac{1}{2\pi} \int_{-\infty}^{+\infty} [S(\omega)] \begin{bmatrix} U_o(\omega) \\ O \end{bmatrix} e^{j\omega t} d\omega \quad (12)$$

As the signals are pulsed ones, it is convenient to refer to their Laplacian presentation, by substituting $j\omega = p$ in expression (12):

$$\begin{bmatrix} U_N(t) \\ V_N(t) \end{bmatrix} = \frac{1}{2\pi j} \int_{a-j\infty}^{a+j\infty} e^{-\phi(p)} \prod_{i=1}^{N} [(t_i><t_i) + \quad (13)$$

$$e^{-\frac{2\Delta S_i}{C}\sqrt{\left[\frac{\gamma_1(p)-\gamma_2(p)}{2}\right]^2}} \cdot (h_i><h_i)] \begin{bmatrix} U_o(p) \\ 0 \end{bmatrix} e^{-pt} dp$$

The essence of the disclosed method can be held substantiated when with the parameters $\psi$, L, $\gamma_1$ and $\gamma_2$ of the MWL being known and with a given reference signal $U_o(t)$ at the input of the MWL, generally available electronic techniques of measurement and processing of time-related output signals $U_N(t)$ and $V_N(t)$ would yield the distribution of the values $K_i$ and $\Delta S_i$ longitudinally of the MWL.

The electronic measurement techniques are understood here as measurements of amplitude, frequency and phase ratios of electric signals, and also measurements of time intervals between signals. The processing is understood as the capacity of performing algebraic operations with the signals.

Let us provisionally consider the method of monitoring the state of an elongated object with the employment of an undispersed MWL. Here, $$\gamma_{1,2} = \frac{\omega}{C} \beta_{1,2},$$

and the delays $\beta_{1,2}$ are not dependent on the frequency $\omega$.

With this restriction applied, expression (13) acquired the form:

$$\begin{bmatrix} U_N(t) \\ V_N(t) \end{bmatrix} = \frac{1}{2\pi j} \int_{a-j\infty}^{a+j\infty} e^{-pt_o} \prod_{i=1}^{N} [(t_i><t_i) + \quad (14)$$

$$e^{-\Delta t_i p} \cdot (h_i><h_i)] \cdot \begin{bmatrix} U_o(p) \\ 0 \end{bmatrix} \cdot e^{pt} dp,$$

where $$\Delta t_i = \frac{2 \cdot \Delta S_i}{C} \sqrt{\left(\frac{\delta}{2}\right)^2 + \tau_i^2} \; ; \; \delta = \beta_1 - \beta_2;$$

$$t_o = \frac{L}{C}\left(\frac{\beta_1 + \beta_2}{2}\right) - \frac{1}{C} \sum_{i=1}^{N} \sqrt{\left(\frac{\delta}{2}\right)^2 + \tau_i^2} \cdot \Delta S_i.$$

The factor expressed as $e^{-\Delta t_i p}$, where $\Delta t_i$ has the dimension of time, determines the delay time of the signal in propagation of this signal along the MWL, in accordance with the theorem of displacement of the inverse Laplace transform. Providing for this, expression (14) yields recurrent ratios of the signals in the MWL:

$$\begin{bmatrix} U_i(t) \\ V_i(t) \end{bmatrix} = (t_i><t_i) \begin{bmatrix} U_{i-1}(t) \\ V_{i-1}(t) \end{bmatrix} + (h_i><h_i) \begin{bmatrix} U_{i-1}(t - \Delta t_i) \\ V_{i-1}(t - \Delta t_i) \end{bmatrix} \quad (15)$$

where $U_{i-1}(t)$, $V_{i-1}(t)$ and $U_i(t)$, $V_i(t)$ are, respectively, the signals at the input and output of the i-th element of the MWL. Thus, for the signals at the output of the MWL:

$$\begin{bmatrix} U_N(t) \\ V_N(t) \end{bmatrix} = \quad (16)$$

$$(t_N><t_N) \begin{bmatrix} U_{N-1}(t) \\ V_{N-1}(t) \end{bmatrix} + (h_N><h_N) \begin{bmatrix} U_{N-1}(t - \Delta t_N) \\ V_{N-1}(t - \Delta t_N) \end{bmatrix}$$

and with $t \leq 0$, $V_N(t) = U_N(t) = 0$.

Withing a time interval $t_1 < t < (t_1 + \Delta t_N)$, according to expression (10), the signals at the output of the MWL are expressed as:

$$\begin{bmatrix} U_N(t) \\ V_N(t) \end{bmatrix} = (t_N><t_N) \begin{bmatrix} U_{N-1}(t) \\ V_{N-1}(t) \end{bmatrix} = \quad (17)$$

-continued $$\frac{U_{N-1}(t) + th\frac{X_N}{2} V_{N-1}(t)}{\sqrt{1 + th^2 \frac{X_N}{2}}} \begin{bmatrix} 1 \\ th\frac{X_N}{2} \end{bmatrix}$$

Expression (17) suggests that within a time interval $\Delta t_N$ starting from the moment $t_o$ of arrival of the signal at the input of the MWL, the ratio $V_N(t):U_N(t)$ is constant, and can be determined, as follow:

$$\frac{V_N(t)}{U_N(t)} = th\frac{X_N}{2}, \quad t_o < t < (t_o + \Delta t_N) \tag{18}$$

In this way, there are determined the values of $th(X_N/2)$ and $\Delta t_N$ which, in their turn, can be used to determine the values:

$$ShX_N = \frac{2\tau_N}{\delta}; \quad K_N \frac{\tau_N}{\psi}; \quad \Delta S_N = \frac{\Delta t_N C}{\sqrt{\delta^2 + (2\tau_N)^2}}, \tag{19}$$

while expressions (10) and (8) are used to determine the vectors $<t_N$ and $<h_N$.

Now, the signals $U_{N-1}(t)$ and $V_{N-1}(t)$ should be determined. To achieve this, the signals $U_N(t)$ and $V_N(t)$ are processed in accordance with an operational algorithm:

$$(t_N > < t_N) \begin{bmatrix} U_N(t) \\ V_N(t) \end{bmatrix} = t_N > \begin{cases} Q_1(t); & t > t_o \\ 0; & t < t_o \end{cases} \tag{20}$$

$$Q_1(t) = \frac{U_{N-1}(t) + th\frac{X_N}{2} V_{N-1}(t)}{\sqrt{1 + th^2 \frac{X_N}{2}}},$$

$$(h_N > < h_N) \begin{bmatrix} U_N(t) \\ V_N(t) \end{bmatrix} = h_N > \begin{cases} 0; & t_o < t < t_o + \Delta t_N \\ Q_2(t); & t > t_o + \Delta t_N \end{cases},$$

$$Q_2(t) = \frac{th\frac{X_N}{2} U_{N-1}(t) - V_{N-1}(t)}{\sqrt{1 + th^2 \frac{X_N}{2}}}.$$

The second equation of (20) yields accurate determination of the time stretch $\Delta t_N$. Then $Q_1(t)$ is shifted (delayed) over time "t" by the value $\Delta t_N$:

$$(t_N >)Q_1(t) \to (t_N >)Q_1(t - \Delta t_N) \tag{21}$$

and the following addition is effected:

$$(t_N >) Q_1(t - \Delta t_N) + (h_N >) Q_2(t - \Delta t_N) = \begin{bmatrix} U_{N-1}(t) \\ V_{N-1}(t) \end{bmatrix}, \tag{22}$$

based on expression (20). The vector thus obtained is subjected, in its turn, to operations in accordance with expressions (18) to (22). This yields the determination of $K_{N-1}$, $\Delta S_{N-1}$ and of the vector $\{[U_{N-2}, V_{N-2}]\}^T$ The iteration is repeated up to the N-th step, yielding ultimately the vector $\{[U_o(t); 0]\}^T$ which is the reference signal at the input of the MWL.

Thus, the abovedescribed operational algorithm supplies the theoretical substantiation of the ability of employing a double-mode MWL with one reference channel and one measurement channel, interacting in dependence on variation of the parameter being monitored—e.g. the curvature K(S) of the pipeline 1—for determining the distribution of this monitored parameter K(S) along the predetermined coordinate axis S. In case of planar flexure of the pipeline 1, the known ratio supplied by theoretical mechanics can be employed for determining the distribution of the bending torque:

$$M(S) = EJ \cdot K(S),$$

where EJ is the rigidity in flexure of the pipeline 1.

As generally accepted, the value of M(S) is one of the essential mechanical characteristics determining the internal strained state of the pipeline 1. This proves the feasibility of employing an MWL booth as the responsive element and the line of transmission of information on variation of the monitored parameter in the monitoring zone, for subsequent determination of the physical and mechanical characteristics of the state of an elongated object.

Thus, in order to determine the physical and mechanical characteristics of the state of the elongated object 1 along a predetermined coordinate axis S (along which the parameter or variable being monitored is varying), there is extracted the amplitude of the electric signal at the output of the reference channel, the electric signal at the output of the measurement channel is amplified in inverse proportion to the value of the amplitude of the electric signal at the output of the reference channel, and linear scale transformation is employed to relate the value of the differential of deceleration (delay) of the phase velocities of the modes of the reference and measurement channels of the extended line 3 of transmission of wave energy to the current time of monitoring and the count of the value of the coordinate S along the extended line 3 of transmission of wave energy.

Following hereinbelow is the substantiation of the requirements to be satisfied by the MWL employed and the reference signal used for the operability of the MWL in the mode of a linear measurement instrument, as follow from (9) above. For this purpose, the matrix [S] used in expressions (8) to (10) will be represented by a polynomoidal matrix series by the degrees (powers) of the value $th(x_i/2)$:

$$[S] = e^{-pt_o} \theta \left\{ \begin{bmatrix} 1 & 0 \\ 0 & e^{-pt_{oN}} \end{bmatrix} + \sum_{i=0}^{N} \begin{bmatrix} 1 & 0 \\ 0 & e^{-p\Delta t_{oi}} \end{bmatrix} \begin{bmatrix} 0 & -\Delta \tau_i \\ \Delta \tau_i & 0 \end{bmatrix} \begin{bmatrix} 1 & 0 \\ 0 & e^{-p\Delta t_{i+1,N}} \end{bmatrix} + \right. \tag{23}$$

-continued $$\sum_i \sum_j \begin{bmatrix} 1 & 0 \\ 0 & e^{-pt_{oi}} \end{bmatrix} \begin{bmatrix} 0 & -\Delta\tau_i \\ \Delta\tau_i & 0 \end{bmatrix} \begin{bmatrix} 1 & 0 \\ 0 & e^{-pt_{i+1,j}} \end{bmatrix} \begin{bmatrix} 0 & -\Delta\tau_j \\ \Delta\tau_j & 0 \end{bmatrix} \begin{bmatrix} 1 & 0 \\ 0 & e^{-p\Delta t_{j+1,N}} \end{bmatrix} +$$

$$\sum_i \sum_j^{i<j} \sum_K \begin{bmatrix} 1 & 0 \\ 0 & e^{-pt_{oi}} \end{bmatrix} \begin{bmatrix} 0 & \Delta\tau_i \\ \Delta\tau_i & 0 \end{bmatrix} \begin{bmatrix} 1 & 0 \\ 0 & e^{-pt_{i+1,j}} \end{bmatrix} \begin{bmatrix} 0 & -\Delta\tau_j \\ \Delta\tau_j & 0 \end{bmatrix} \begin{bmatrix} 1 & 0 \\ 0 & e^{-pt_{i+1,K}} \end{bmatrix} \times$$

$$i<j<K \times \begin{bmatrix} 0 & -\Delta\tau_K \\ \Delta\tau_K & 0 \end{bmatrix} \begin{bmatrix} 1 & 0 \\ 0 & e^{-p\Delta t_{K+1,N}} \end{bmatrix} + \ldots,$$

where $$\theta = \prod_{i=1}^{N} \frac{1 + th\frac{X_i}{2} \cdot th\frac{X_{i+1}}{2}}{\sqrt{1 + th^2\frac{X_i}{2}} \sqrt{1 + th^2\frac{X_{i+1}}{2}}}$$

$$X_o = 0; X_{N+1} = 0; t_{i,j} = \sum_{m=i}^{m=j} \frac{\Delta S}{C} \sqrt{\delta^2 + (2\tau_m)^2} = \sum_{m=i}^{m=j} \Delta t_m;$$

$$\Delta\tau_i = \frac{th\frac{X_i}{2} - th\frac{X_{i+1}}{2}}{1 + th\frac{X_i}{2} th\frac{X_{i+1}}{2}} \simeq \frac{\tau(S_i) - \tau(S_{i+1})}{\delta}$$

The factor Q represents the decline of the amplitude of the reference and measurement signals due to the power spent on the measurements. The first term of the series corresponds to direct passage of the signal via the reference and measurement channels without any interaction therebetween. The second term forms a linear additive component of the measurement signal, and the other N−2 terms form the multiplicative component in the reference and measurement channels, which is the error in the linear measurement process. As follows from expression (23), the multiplicative additive to the measurement signal is determined by the out-of-diagonal even-numbered terms of the series, starting with the fourth term. The highest-degree term of the multiplicative additive has the value $\Delta r_i \cdot \Delta r_j \cdot \Delta r_K$, its maximum magnitude being substantially dependent on the spectrum of the value being measured. For non-resonance spectra, the multiplicative additive has the maximum value of $r^3_{max}/4$, and for resonance spectra with a $T_c$ period of the central frequency it is $n^2/4(\Delta r_n)^3$, where $n=L/T_c$. The required dynamic range D of measurement of the parameter being monitored is generally determined as $D=r_{max}/r_{min}=K_{max}/K_{min}$, where $r_{max}$ is the maximum value of the coupling coefficient along the MWL, corresponding to the maximum value $K_{max}$ of the parameter being monitored, and $r_{min}$ is the minimum value of the coupling coefficient, corresponding to the minimum value $K_{min}$ of the monitored parameter, which should be discernible against the background of various noise. Then the following ratios are proper:

$$D \leq \frac{r_{max} \cdot 4\delta^2}{(\Delta\tau_{max})^3}, \quad r_{max} \leq \frac{2\delta}{\sqrt{D}}, \quad (24)$$

which, when satisfied, ensure that the value $r_{max}$ of the maximum coupling coefficient provides for the linear mode of measurement of the parameter being monitored.

The following requirements to be met by the reference signal are derived from consideration of the additive component at the output of the MWL, defined by the first and second terms of the series (23):

$$\begin{bmatrix} U_N(p) \\ V_N(p) \end{bmatrix} = [S] \begin{bmatrix} U_o(p) \\ 0 \end{bmatrix} \simeq \quad (25)$$

$$\sum_{i=1}^{N} e^{-pt_o} \theta \begin{bmatrix} 1 & \Delta\tau_i e^{-pt_{i-1,N}} \\ \Delta\tau_i e^{-pt_i} & e^{-pt_{oN}} \end{bmatrix} \begin{bmatrix} U_o(p) \\ 0 \end{bmatrix}$$

where $$U_N(p) = e^{-pt_o} \theta U_o(p); \quad V_N(p) = e^{-pt_o} \theta \sum_{i=1}^{N} \Delta\tau_i e^{-pt_i} U_o(p)$$

To make the following explanations more specific and understandable, a radio pulse with a $\omega_o$ basic (carrier) frequency is employed as the reference signal, i.e. there is employed an electromagnetic field propagating wave-like through the reference channel of the MWL (the reference signal), which can be represented in the complex form by the following expressions:

$$U_N(t) = \theta U_o(t) e^{-j\omega_o(t-t_o)} = U_N(t) e^{-j\omega_o(t-t_o)} \quad (26)$$

where $U_N(t)$ is the envelope of the reference signal.

An inverse Laplace transform of $V_N(p)$, presented in expression (25) accounting for expression (26) would determine the measurement signal:

$$\dot{V}_N(t) = \sum_{i=1}^{N} \dot{U}_N(t)(t - t_i)\Delta\tau_i = \sum_{i=1}^{N} U_N(t - t_i)\Delta\tau_i e^{j\omega_o(t-t_i)}, \quad (27)$$

where "t" is counted from $t_o$. From expression (23), one is able to determine $$t_{ij} = t_{oN} = \sum_{i=0}^{N} \Delta t_i = T;$$

then, by dividing and multiplying (27) by $\Delta t_i$, and proceeding to the limit at $(T/\Delta t_i) = N \to \infty$, $\Delta t_i \to 0$, we obtain an expression of $V_N(t)$ with continuous values of r(t):

$$\dot{V}_N(t) = e^{j\omega_o t} \int_0^t U_N(t-\theta) \frac{\tau'(\theta)}{\delta} \cdot e^{-j\omega_o \theta} d\theta = \quad (28)$$

$$e^{j\omega_o t} \int_{t-\tau}^t = U(t-\theta) \frac{\tau'(\theta)}{\delta} \cdot e^{-j\omega_o \theta} d\theta,$$

$$\tau'(\theta) = \frac{\delta \tau(\theta)}{\partial \theta}.$$

FIGS. 3a, b, c, d, e, f present the characteristics and plots of signals of the MWL with the disclosed method of monitoring the state of an elongated object employing electromagnetic waves in the radio frequency band, illustrating the main analytical expressions used in the substantiation of the method and the algorithm of processing the signals for arriving at the parameter being monitored. The diagram 5 in FIG. 3a represents the dependence of the coupling coefficient $r(S) = \psi K(S)$ of the MWL on the distribution of the curvature $K(S)$, as shown in FIG. 2. FIG. 3b presents the diagram 6 of the distribution of the rate of variation of the coupling coefficient $$\Delta r(S) = \frac{\partial r(S)}{\partial S} dS = \frac{\partial K(S)}{\partial S} dS$$

as a Dirac delta function with the weight $\Delta r$. The reference signal 7 with the carrier frequency $\omega_o$ and duration $\tau$ is shown in FIG. 3c. The measurement signal 8 and its envelope 9 accounting for the carrier frequency and phase of the radio pulses are presented, respectively, in FIGS. 3d and 3e. This signal 8 is obtained by directly substituting the delta function in expression (28). The envelope 9 can be extracted e.g. by synchronous detection. The location of pulses of the measurement signal 8 along the time-axis "t" (FIG. 3d) relative to the leading front of the reference signal 7 (FIG. 3c) is determined from $S=(t\cdot c)/(\delta)$. Integration of the envelope 9 over time "t" and calculation of "t" into S yields the monitored distribution of the curvature $K(S)$ along the predetermined coordinate S, as presented by diagram 10 in FIG. 3f. Thus, FIGS. 3a, b, c, d, e, f vividly illustrate the major operations making up the disclosed method of monitoring the state of an elongated object, whose feasibility has benn proved in the above theoretical substantiation.

Among the major characteristics of the measurement process in implementing the disclosed monitoring method are its accuracy and resolution.

The accuracy of measurements is affected by the non-ideal character of the rectangular function of distribution of $K(S)$, the duration of the reference signal $\tau$ and its corresponding extent along the S-axis, which defines the resolution of measurements in the monitoring operation. Normalization of the measurement signal in accordance with the disclosed method of monitoring is performed with the amplitude of the envelope of the reference signal $U_N(t)$ at the output of the MWL. Therefore, expressions (27) and (28) yield a differential relationship between the parameter being measured and the envelope of the measurement signal, normalized by the amplitude of the reference signal:

$$V(t) = \frac{U_N(0)}{\delta} \cdot \frac{\tau(t) - \tau(t+\tau)}{\tau} \cdot \tau \approx \frac{U_N(0)}{\delta} \tau'(t) \cdot \tau,$$

where $\tau'(t) = \frac{\partial \tau(t)}{\partial t}$ assuming that $\tau_{max} = 2\delta/\sqrt{D}$, and accounting for:

$$\frac{\tau(t)}{\tau_{max}} = \frac{K(t)}{K_{max}}; \tau(t) = \frac{K(t)}{K_{max}} = \frac{2\delta}{\sqrt{D}}; \quad (29)$$

$$\frac{\partial K(t)}{\partial K} = \frac{V(t) K_{max} \sqrt{D}}{U_N(0) \cdot \tau}$$

In the above expression, V(t) and $U_N(t)$ are, respectively, the amplitudes of the measurement and reference signals normallized by the power of the reference signal at the output of the MWL.

To provide for the required resolution $\Delta S$, the reference signal $U_N(t)$ should be a pulse of a width $\tau$ satisfying the condition:

$$\tau \leq \frac{\Delta S}{C} \delta \quad (30)$$

In addition to the requirements of linearity, resolution and accuracy of measurement in the monitoring operation, the abovediscussed theoretical substantiation proves the feasibility of the disclosed method of monitoring the state of an elongated object, the properness of disclosure of its main distinguishing features, the sequence of operations and the solution given to the problem presented by the objects of the present invention.

To expand the dynamic range of measurements of the variable or parameter being monitored into the area of its minimum values, there are allocated in the extended line 3 of transmission of wave energy at least one reference channel and at least one measurement channel with the same values of deceleration (delay) of the phase velocities of the modes. The extended line 3 of transmission of wave energy is divided into portions of lengths "l". A constant delay value of the signal between these lengths in either one of the channels is provided for, and the integral value of the monitored parameter or variable is measured over the selected portions of lengths "l". In other words, when small values of the monitored parameter distributed over a considerable length are measured, with its local values being beyond the normal measurement range, it is necessary to measure the integral value of the monitored parameter over the selected portions of the elongated object. To attain this, at a selected portion "l" the MWL is made in the form of a two-channel line with the same constant of propagation along the two channels, i.e. $\delta = 0$. In this case, the scattering matrix $[S_i]$ of an elementary portion of the MWL, of a length $\Delta S$ is determined from expression (9) by proceeding to the limit $\delta \to 0$:

$$\delta \to 0[S] = e^{-p\Delta t[T]} \begin{bmatrix} 1 & 0 \\ 0 & e^{-p\Delta t i\tau(S_i)} \end{bmatrix}$$

-continued $$\text{where } [T] = \begin{bmatrix} 1 & 1 \\ 1 & -1 \end{bmatrix} \frac{1}{\sqrt{\tau}}$$

$$[S_i] = [T] \begin{bmatrix} 1 & 0 \\ 0 & e^{-\frac{p}{L}\sum_{i=1}^{N}\tau^i \Delta t_i} \end{bmatrix} [T]e^{-p t_p} =$$

$$= e^{-p t_l}[T] \begin{bmatrix} 1 & 0 \\ 0 & e^{-\frac{p\beta}{L}\int_0^l \tau(S)dS} \end{bmatrix} [T]$$

$$\lim N \to \infty; \Delta t_i \to 0; t_l = \frac{\beta L}{C}$$

and the expression of the reference signal V(p) would be determined from expression (28) with δ=0:

$$V(p) = U(p) \cdot e^{-pt_l} \left( 1 - e^{-\frac{p\beta}{C}\int_0^l \tau(S)dS} \right) \cdot \frac{1}{2}$$

With the carrier frequency $\omega_o$, the measurement signal can be related to time, same as above, in the following way:

$$V(t) \approx U_o(t) \frac{\left[ 1 - e^{-j\frac{\omega_o \beta}{C}\int_0^l \tau(S)dS} \right] \cdot e^{-j\omega_o(t-t_l)}}{2} \approx \qquad (31)$$

$$\approx jU_o(t)\frac{1}{2} \frac{\omega_o \beta}{C} \int_0^l \tau(S)dS \cdot e^{j[\omega_o(t-t_l)-\phi_l]}$$

$$\text{where } \phi_l = \frac{\beta \omega_o}{C} \int_0^l \tau(S)dS$$

Thus, the reference signal 11 (FIG. 4a) differs in time from the position of the measurement signal 12 (FIG. 4b) only by the phase $\phi_l$ of its high carrier frequency. Its amplitude is proportional to an integral over the measured parameter, over the length "l" of the corresponding portion of the MWL. The reference channel 13 (FIG. 5) and measurement channel 14 are structurally separated in the MWL. To select in time at the output of the MWL the measurement signals from each portion of the length "l", either the reference channel 13 or the measurement channel 14 (as illustrated in FIG. 5), enclosed in an earthed shield 15, is made to include a section of a single-mode, single-channel waveguide forming a delay loop 16 in the respective channel (the measurement channel 14) for a delay equalling the maximum duration of the reference signal τ=(l/c) where is deceleration of the phase velocities of the modes of the reference and measurement channels of the MWL. The duration of the reference signal should be such that it should occupy in space a length not exceeding the length "l" of the portion of the MWL, i.e.

The time-dependent relationship of signals in this MWL is illustrated in FIG. 6. The curve 17 (FIG. 6a) corresponds to the reference signal at the output of the MWL, and the curve 18 (FIG. 6b) corresponds to the measurement signal represented by a sequence of pulses corresponding by their amplitude to the integral value of the measured parameter at a portion of the length "l", delayed relative to the reference signal by time i$\tau_l$, where $\tau_l$ is the delay time at the loop 16 (FIG. 5), and "i" is the consequtive number of the portion, counted from the output end of the MWL.

To obtain an electric signal corresponding to the parameter being measured, it could be expedient to employ for the reference signal a video pulse (having no high carrier frequency). In this case, a line used as the MWL should have no cut-off frequency, i.e. it should provide for transmitting a video signal. Among lines meeting this requirement one can name coaxial transmission lines, multiwire radio lines, and others. This would essentially simplify the primary treatment of the signal, with no coherent microwave or other sources required.

In this case, $\omega_o=0$, and the following expression is derived for $V_M(t)$:

$$V_M(t) = \frac{1}{2\pi j} \int_{a-j\infty}^{a+j\infty} \frac{pU(p)}{C} \left( P\frac{\delta}{C} \right) \cdot e^{pt}dp \qquad (32)$$

By selecting as the reference signal the single leap 19 (FIG. 7a) of voltage $$U(t - t_o) = \begin{cases} U_o; & t \geq t_o \\ 0; & t < t_o \end{cases},$$

which can be represented as $$U(p) = \frac{U_o}{p} e^{-pt_o},$$

we obtain from (32) a direct representation of the monitored parameter in the measurement signal 20 (FIG. 7b):

$$V(t) = \frac{1}{\delta} U_o \tau \left( \frac{t \cdot C}{\delta} \right), t_o \leq t \leq \frac{\Delta \delta}{C}. \qquad (33)$$

The termination of the single leap 19, with t=t$_1$, would also produce a measurement signal 20, but of the inverted sign. Therefore, in this case the reference signal is in the form of a video pulse of a duration T≧(l/c)δ, with a recurrence rate F≧(1/2T).

The parameter or variable monitored by employing the disclosed method can be temperature, pressure, humidity, density or salinity, or their combinations.

Thus, if the parameter or variable being monitored is the pressure P°(S) or temperature t°(S) varying longitudinally of the zone of monitoring the elongated object 1, the MWL should include a material of which the electro-optical parameters respond to variation of the above parameters or variables.

At present, there is known and available a sufficiently broad range of dielectric materials whose dielectric permittivity is substantially dependent on the temperature or pressure of the environment. These materials, which are as a rule either piezoelectric or segnetoelectric materials, can serve as a base for partly filling waveguides of either VHF or optical ranges. By filling up one of the channels, preferably the measurement channel 14, either partly or completely with a dielectric material of the abovedescribed type, we obtain an MWL whose value δ of the differential of deceleration of the phase velocities of the modes, respectively, of the reference and measurement signals is modulated along S-axis in dependence on deviations of either temperature or pressure longitudinally of the elongated object being monitored from a predetermined average or mean value. To determine the functional relationship between variations of either pressure or temperature and the time-dependent structure of the measurement signal of the MWL, there is defined the dependence of δ on either the pressure P° or temperature t°, as:

$$\delta(P^o, t^o) = \delta + \frac{\partial \delta[P^o(S); t^o(S)]}{\partial(P^o; t^o)} \times (P^o; t^o), \quad (34)$$

where P°(S) and t°(S) are deviations of the actual values of P° and t° from the average values of these variables longitudinally of the elongated object. Furthermore, it is necessary that with P°(S)=0 and t°(S)=0, there should be maintained between the reference and measurement channels the interaction with a coupling coefficient r(S)=const=r, satisfying the condition r<<δ (by at least an order of magnitude), Then, there is defined the scattering matrix [$S_i$] over an elementary portion of the MWL of a length ΔS in variation of either P° or t°, accounting for expressions (9), (10) and (34):

$$[S_i] \begin{bmatrix} \frac{\tau}{\delta^2 + \tau^2} \cdot e^{-\frac{2\Delta S}{C} P \sqrt{\delta^2 + \tau^2}} & 1 \\ & -\frac{\tau}{\sqrt{\left(\frac{\delta^2}{2}\right)^2 + \tau^2}} \cdot e^{-\frac{2\Delta S}{C} P \sqrt{\left(\frac{\delta^2}{2}\right)^2 + \tau^2}} \\ e^{-\frac{2\Delta S}{C} P \sqrt{\left(\frac{\delta^2}{2}\right)^2 + \tau^2}} & \end{bmatrix} \quad (35)$$

The coupling of the reference and measurement channels due to variation of δ, according to (34), is expressed as:

$$\tau(S) = \frac{\tau}{\sqrt{\left(\frac{\delta^2}{2}\right)^2 + \tau^2}} +$$

$$\frac{1}{2} \frac{\delta}{\sqrt{\left(\frac{\delta^2}{2}\right)^2 + \tau^2}} \frac{\partial \delta}{\partial(P^o; t^o)} [P^o(S); t^o(S)] -$$

$$\frac{1}{2} \frac{\Delta S}{C} \frac{P\tau}{\sqrt{\left(\frac{\delta^2}{2}\right)^2 + \tau^2}} \frac{\partial \delta}{\partial(P^o; t^o)} [P^o(S); t^o(S)]$$

By discarding the terms of high degrees of smallness, and terms which are S-constant, there is produced an expression of [$S_i$] coinciding with expression (9) above, provided that:

$$X_i = \text{Arcsh}\left[\frac{1}{2} \frac{\delta}{\sqrt{\frac{\delta^2}{12} + \tau^2}} \frac{\partial \delta}{\partial(P^o; t^o)} [P^o(S); t^o(S)]\right] \quad (36)$$

Now, similarly to the monitoring of the curvature or flexure discussed hereinabove, it is possible to reproduce the distribution of the monitored pressure or temperature along the given MWL represented by the S-axis, when the line is situated in the zone of monitoring the elongated object—which may ultimately be the environment itself.

From the above theoretical substantiation of feasibility of the disclosed method of monitoring the state of an elongated object, it is evident that the method solves the problems stated hereinabove as the objectives of the present invention. This can be proved by feasibility of establishing remote monitoring by employing wavelengths of the optical range at distances as great as hundreds of kilometers from an elongated object, or else of elongated objects which are themselves as long as hundreds of kilometres, with appropriate zones of monitoring. This can be provided for, e.g. by employing present-day fibre optics lines as the MWL. Another proof of the expansion of the kinds and ranges of variation of monitored parameters or variables owing to the present invention, with simultaneous enhancement of the accuracy and resolution of measurements, is presented by the versatility of the disclosed method with respect to the nature of monitorable parameters and variables, and their established relationship with the structures of the reference and measurement channels employed, same as with the characteristics of the MWL. Swifter response and reduction of the energy input are attained by the disclosed method owing to the elimination of the necessity of supplying power to the sensors, as the functions of the responsive elements and data transmission means are integrated in the MWL itself, e.g. in the optical range of wavelengths.

An apparatus for monitoring the state of an elongated object, capable of performing the disclosed method, comprises a source 21 (FIG. 8) of modulated wave energy, an extended line 3 of transmission of wave energy, situated in the zone of monitoring the elongated object 1, e.g. a pipeline, along a predetermined S-axis, intended for capture and transmission of data on variation of the parameter K(S) being monitored. The extended line 3 of transmission of wave energy in the presently described apparatus is in the form of a multimode waveguide with at least one reference channel 13 and at least one measurement channel 14, interacting in correspondence with variation of the monitored parameter K(S).

The apparatus for monitoring the state of the elongated object 1 further comprises a data processing unit 22 intended for extracting from the extended line 3 of transmission of wave energy the reference signal transformed by this line 3, for determining the physical and mechanical characteristics of the state of the object 1 being monitored, and a spatial filter 23 operable for shaping a reference signal of the space- and time-dependent pattern of the predetermined mode, connected intermediate the output of the source 21 of modulated wave energy and the extended line 3 of transmission of wave energy. The spatial filter 23 has inputs 24, 25, and the area of joining the spatial filter 23 to the extended line 3 of transmission of wave energy is indicated with numeral 26.

The apparatus for monitoring the state of the elongated object 1 also comprises another spatial filter 27 operable for converting a signal of the space- and time-dependent pattern of the predetermined mode, obtained at the output of the extended line 3 of transmission of wave energy, into a time-dependent signal, the spatial filter 27 being connected intermediate the extended line 3 and the inputs of the data processing unit 22, and joined to the extended line 3 by an area 28. The spatial filter 27 has inputs 29, 30.

The spatial filters 23 and 27 are preferably identical, of a known structure corresponding to the type of the extended line 3 of transmission of wave energy. Thus, with the line 3 being in the form of a square-section waveguide with waves $H_{10}$ and $H_{20}$ being used as the reference and measurement channels, the filter 23 or 27 is preferably in the form of a 3 dB slot bridge hybrid (not shown) serially connected to the waveguide and having its branches connected to the waveguide through two static phase shifters with a differential phase shift $\pi/2$. In the optical range of wavelengths, the examples of embodiments and operating principles of suitable waveguides are described, e.g. i in Journal of the Optical Society of America, Vol. 60, No. 9, 1980, N. S. Kapany et al. "Fiber Optics. XII. A technique for launching an arbitrary mode in an optical dielectric waveguide", p. 1182.

The apparatus for monitoring the state of the elongated object 1 still further comprises a video display terminal 31 operable for presenting the obtained physical and mechanical characteristics, having its input connected to the output of the data processing unit 22.

The source 21 of modulated wave energy includes a signal generator 32 having its output connected to the input of the spatial filter 23, and a modulator 33 of which the output is connected to the input of the generator 32.

The source 21 modulated wave energy may employ a standard generator of oscillations of the physical field—a laser, a microwave oscillator, or a generator of elastic vibrations.

The data processing unit 22 includes synchronous detectors 34, 35 having their first inputs connected to the respective outputs 29, 30 of the spatial filter 27, an integrator 36, an operational amplifier 37 whose first input is connected to the output of the integrator 36 and whose output is connected to the input of the video display terminal 31, the input of the integrator 36 being connected to the output of the synchronous detector 35, and the second input of the operational amplifier 37 being connected to the output of the synchronous detector 34, and a heterodyne oscillator 38 having its output connected to the respective other inputs of the synchronous detectors 34, 35.

The apparatus for monitoring the state of the elongated object 1 further comprises a directional coupler 39 intended for synchronizing the oscillator 38, the output of the directional coupler 39 being connected to the input of the oscillator 38. The reference channel 13 and the measurement channel 14 of the extended transmission line 3, and both connections of the spatial filter 27 with the synchronous detectors 34 and 35 are enclosed in earthed shields 15.

Figure 9:
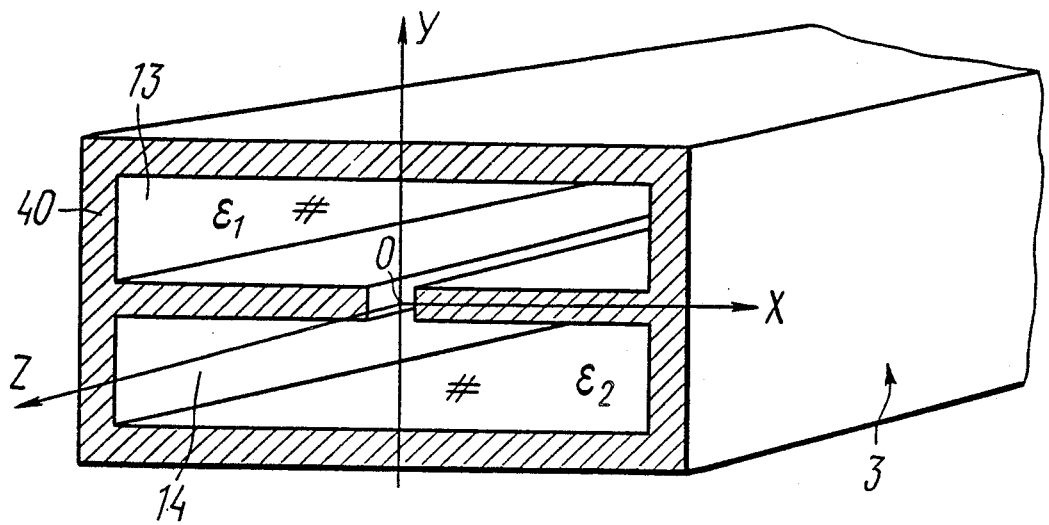
FIG. 9 is a perspective sectional view on a larger scale of an extended line of transmission of wave energy, which is rectangular in cross-section, according to the invention.

FIG. 9 of the appended drawings illustrates an exemplary structure of the extended line 3 for transmission of wave energy. The cross-sectional shape of the wall 40 of the extended line 3 of transmission of wave energy is rectangular. The point of intersection of the cross-section of the extended line 3 of transmission of wave energy with the longitudinal axis of this line 3 is presumed to be the initial point "O" of an X, Y, z system of orthogonal coordinates. Each channel 13 and 14 of the transmission line 3 is filled with a suitable substance, e.g. a dielectric substance, the respective dielectric permittivity values being $\epsilon_1$ and $\epsilon_2$.

Figure 10:
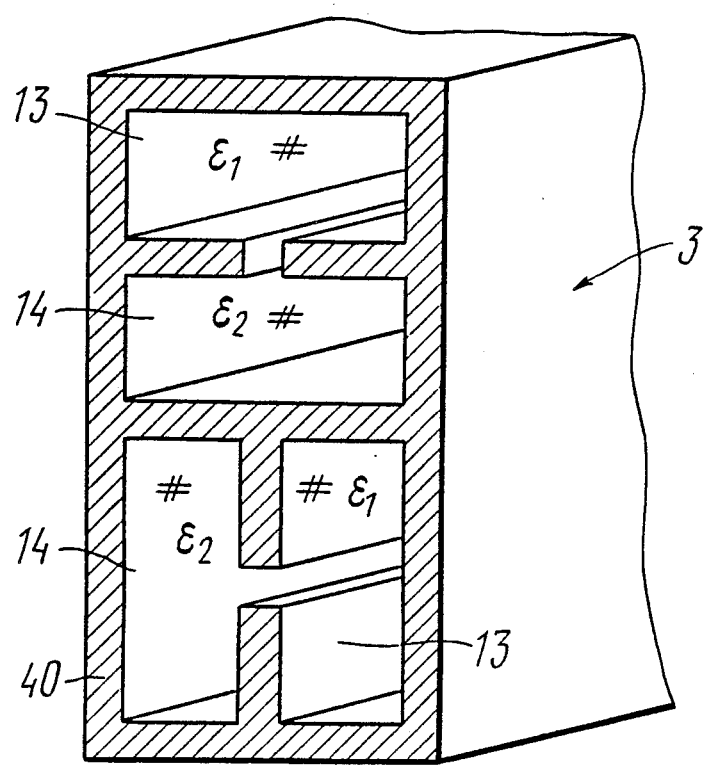
FIG. 10 is a perspective sectional view on a larger scale of an extended line of transmission of wave energy, which in cross-section is a combination of rectangular shapes, according to the invention.

FIG. 10 presents another exemplary structure of the extended line 3 of transmission of wave energy, which in cross-section is a combination of rectangular shapes. Each channel 13 and 14 of this transmission line 3 is likewise filled with a suitable substance, e.g. with a dielectric material, the respective dielectric permittivity values being also $\epsilon_1$ and $\epsilon_2$.

Figure 11:
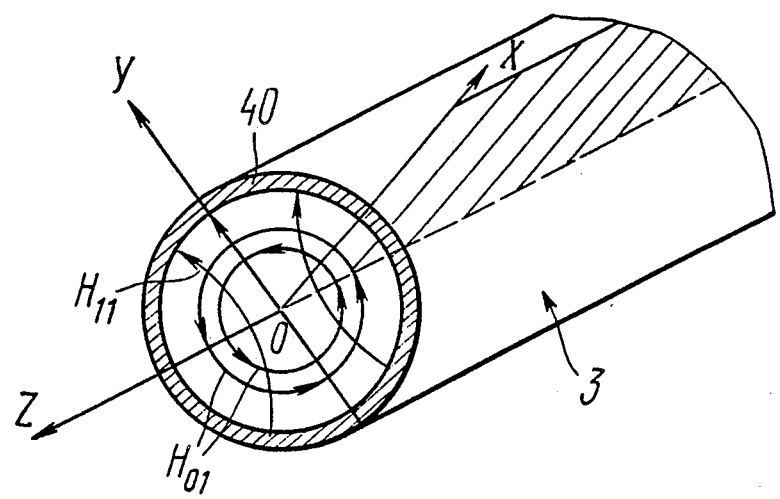
FIG. 11 is a perspective sectional view on a larger scale of an extended line of transmission of wave energy, which is annular in cross-section, according to the invention.

FIG. 11 shows yet another exemplary structure of the extended line 3 of transmission of wave energy with an annular cross-sectional shape of the wall 40, the point of intersection of the plane of this cross-section with the longitudinal axis of the extended line 3 of transmission of wave energy being presumed to be the initial point "O" of an X, Y, Z system of orthogonal coordinates. There are shown in the cross-section of this transmission line 3 the distributions of the radially curving $H_{11}$ and annular $H_{01}$ lines of electric field strength.

Figure 12:
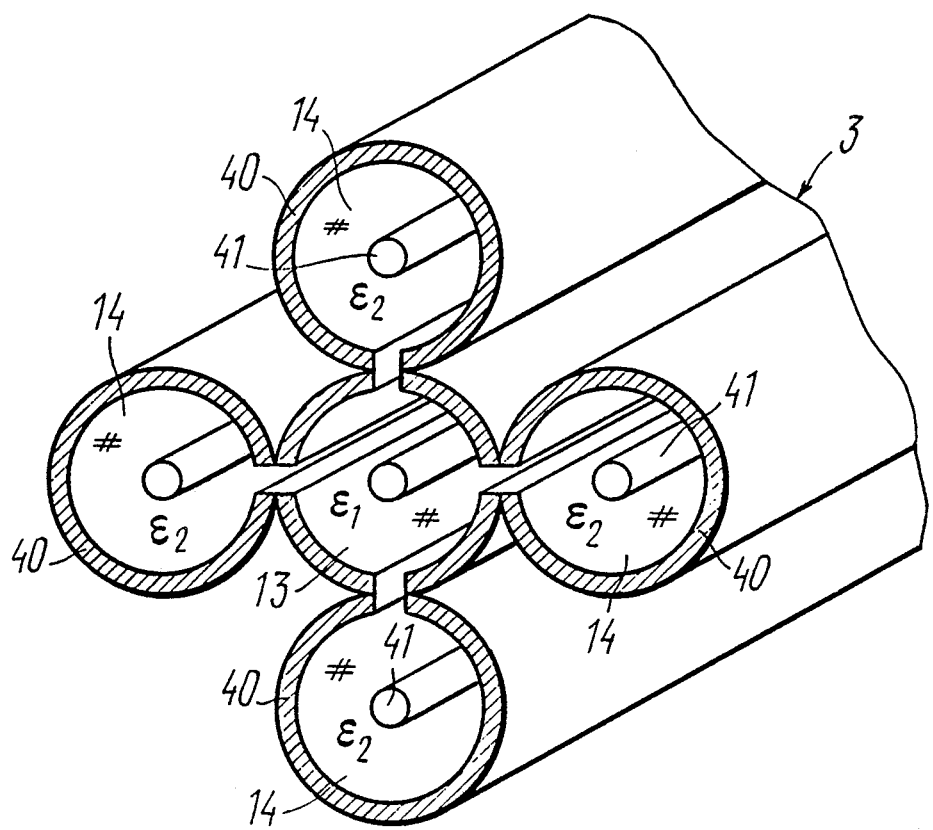
FIG. 12 is a perspective sectional view on a larger scale of an extended line of transmission of wave energy, which in cross-section is a combination of annular shapes, according to the invention.

FIG. 12 presents still snother exemplary structure of the extended line 3 of transmission of wave energy, which in cross-section is a combination of several sections of annular shape. Thus, each channel 13 or 14 of this coaxial-type transmission line 3 includes a wall 40, a central core 41 and a substance filling up the space therebetween, e.g. a dielectric material. Thus, the channel 13 is filled with a dielectric material of dielectric permittivity $\epsilon_1$, and the channel 14 is filled with a dielectric material 14 of dielectric permittivity $\epsilon_2$.

When the extended line 3 of transmission of wave energy is operated in an optical range or in an infrared range, the data processing unit 22 additionally includes a heterodyne oscillator converter 42 (FIG. 13) for stepping down the frequency of carrier oscillations of the wave energy, its first and second inputs being the inputs of the data processing unit 22, the respective outputs being connected to the inputs of the first and second synchronous detectors 34 and 35, and the third input being connected to the additional output of the heterodyne oscillator 38.

The heterodyne converter 42 includes mixers 43, 44 whose respective first inputs are connected to the outputs of the spatial filter 27, a mixer 45 having its output connected to the respective second inputs of the mixers 43, 44 and its first input connected to the output of the heterodyne oscillator 38, a heterodyne oscillator 46 having its output connected to the second input of the mixer 45 and its input connected via the directional coupler 39 to one of the outputs of the spatial filter 27. To compensate for frequency conversion losses, the heterodyne converter 42 includes low intermediate-frequency amplifiers (i.f. amplifiers) 47, 48 having their respective inputs connected to the outputs of the mixers 43, 44 and their respective outputs connected to the inputs of the synchronous detectors 34, 35.

Figure 14:
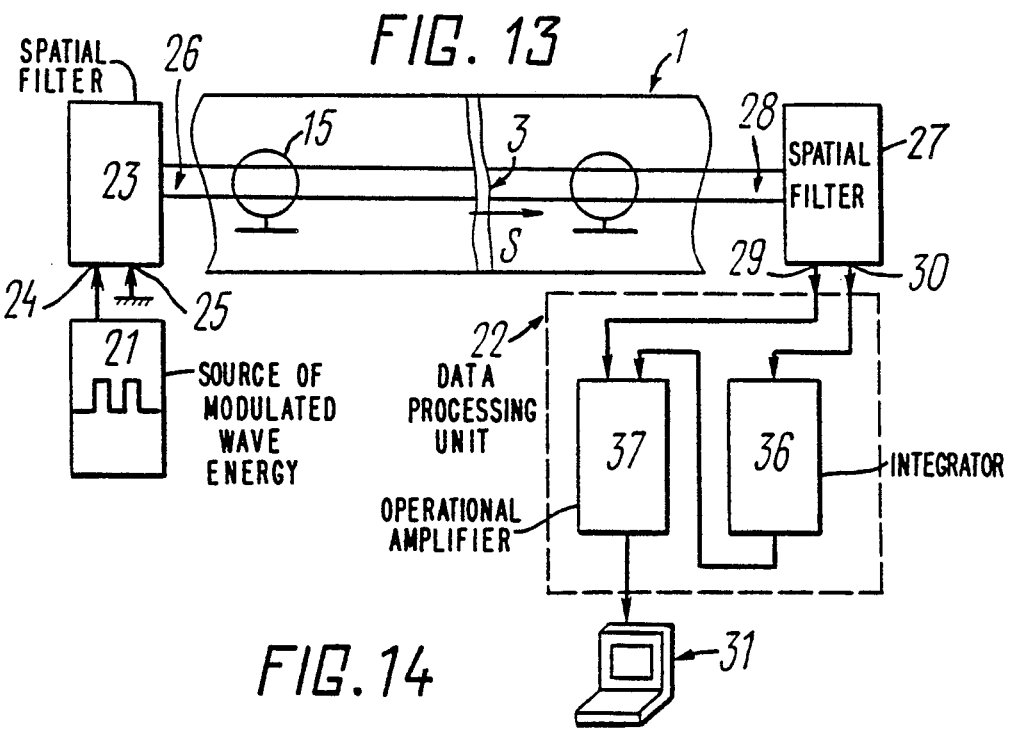
FIG. 14 is the structural block-unit diagram of an apparatus for monitoring the state of an elongated object, incorporating the extended line of transmission of wave energy operable with video signals, in accordance with the invention.

When the extended line 3 of transmission of wave energy is operated with video signals, the disclosed apparatus for monitoring the state of the elongated object 1 (FIG. 14) comprises a series connection of a source 21 of modulated wave energy in the form of a video signal generator, a spatial filter 23, the extended line 3 of transmission of wave energy, supported by the elongated object 1 being monitored, a spatial filter 27, and a data processing unit 22 including an integrator 36 and an operational amplifier 37 having their respective inputs connected to the respective outputs 29, 30 of the spatial filter 27, the other input of the operational amplifier 37 being connected to the output of the integrator 36. The output of the operational amplifier is connected to a video display terminal 31.

The disclosed apparatus for monitoring the state of an elongated object is operated as follows. In the embodiment being described, the monitored parameter characterizing the state of the elongated object 1 (FIG. 8) is the alternating-sign distribution of the curvature K of the elongated object 1 along its longitudinal coordinate axis S. Rigidly connected to the elongated object 1 is the extended line 3 of transmission of wave energy, wherein regular wave processes are disturbed in flexure of the elongated object 1.

Figure 15A:
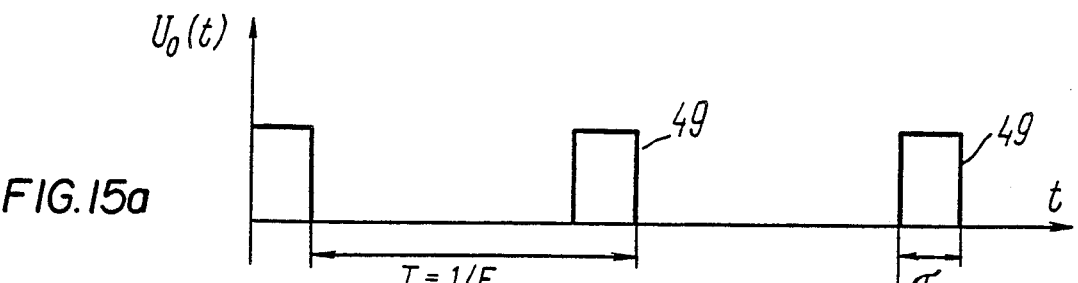
FIGS. 15a–15f present diagrams of signals illustrating the operation of an apparatus for monitoring the state of an elongated object, embodying the invention.
Figure 15B:
Figure 15C:
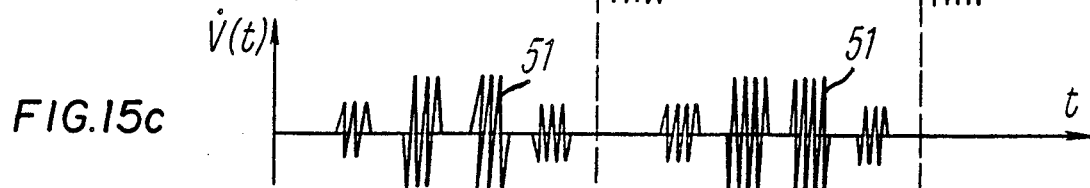

At the initial stage of the monitoring sequence, the modulator 33 produces a train of pulses modulating the oscillations of the signal generator oscillator 32. The diagrams of the modulating pulses 49 are presented in FIG. 15a. The duration $\tau$ of the modulating pulses and the period T defining their recurrence rate are determined by the required monitoring parameters, i.e. the dynamic range of monitoring and its resolution, and also by the parameters of the extended line 3 (FIG. 8) of transmission of wave energy. The signal generator 32 shapes at its output a train 50 (FIG. 15b) of coherent oscillations, e.g. of an electromagnetic microwave field. This train 50 of coherent oscillations is fed to the input of the spatial filter 23 (FIG. 8) which transforms the spatial pattern of the VHF field so that in the area 26 this pattern should correspond to the required pattern of the fields of the modes of the allocated reference channel 13 of the extended transmission line 3. In this way a reference signal is shaped and fed into the transmission line 3. While propagating along the reference channel 13, this signal excites pulses 51 (FIG. 15c) in the measurement channel 14 (FIG. 8) at the flexure points of the extended line 3 of transmission of wave energy, which form a measurement signal coherent with the reference signal. The pulses 51 (FIG. 15c) propagate along the measurement channel 14 (FIG. 8) at a velocity differing from the velocity of propagation of the reference signal.

While passing through the area 28, the microwave fields of the modes of the reference signal and measurement signal are separated in space by the spatial filter 27 and fed to its respective outputs 29, 30 of the wave energy of the fields. These outputs 29, 30 are connected to the inputs of the data processing unit 22. Thus, the measurement and reference signals are fed to the processing unit 22 where the measurement signal is directed to the first input of the synchronous detector 34, and the reference signal is directed to the input of the directional coupler 39 which branches off a certain small part of the energy of the reference signal for synchronizing the heterodyne oscillator 38, while the rest of the energy is fed to the first input of the synchronous detector 35. Simultaneously, the respective other inputs of the synchronous detectors 34 and 35 are fed with a signal from the heterodyne oscillator 38, in the form of a microwave field coherent with the reference signal, whereby there is effected synchronous detection (with retaining the sign of the envelope of the microwave pulses of the measurement signal) of the microwave fields. Therefore, the outputs of the synchronous detectors 35 and 34 feed out electric signals 52 (FIG. 15d) and 53 (FIG. 15e), the signal 52 being proportional to the envelope of the reference signal, and the signal 53 being proportional, with appropriate sign, to the envelope of the measurement signal which, in its turn, represents the distribution of the increments of curvature longitudinally of the elongated object 1 (FIG. 8).

Figure 15D:
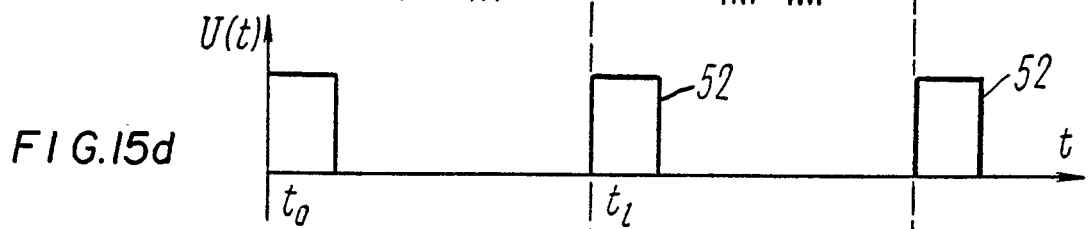
Figure 15E:
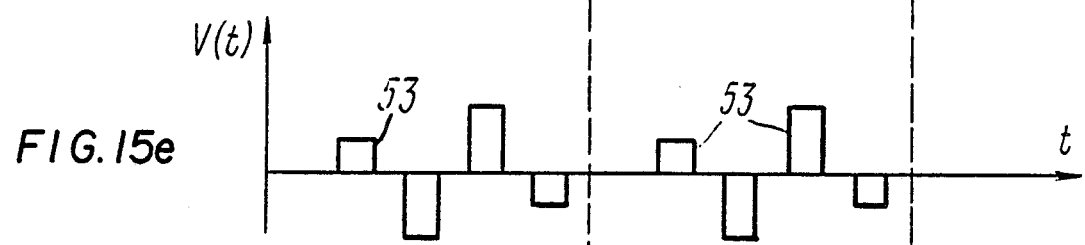
Figure 15F:
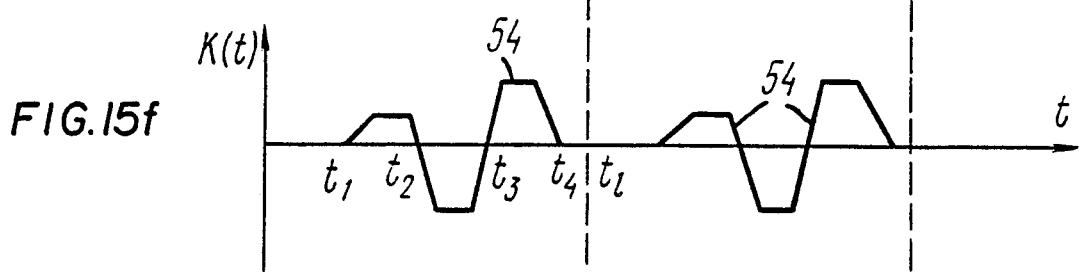

Electric pulses 52 (FIG. 15d) of the reference signal are fed from the output of the synchronous detector 35 (FIG. 8) to the input of the integrator 36 shaping at its output an electric signal corresponding to the amplitude of the pulsed signal 52 (FIG. 15d). The integral amplitude signal is fed from the integrator 36 (FIG. 8) to the first input of the operational amplifier 37. Fed to the second input of the operational amplifier 37 is the signal 53 (FIG. 15e) from the output of the synchronous detector 34 (FIG. 8). The operational amplifier 37 generates at its output an electric signal 54 (FIG. 15f) whose value is determined exclusively by the value of the integral over the increments of the curvature K longitudinally of the elongated object 1 (FIG. 8) and is independent from the value of the reference signal either at the input 24 of the spatial filter 23 or at the output 30 of the spatial filter 27. The electric signal 54 (FIG. 15f) is fed from the output of the operational amplifier 37 (FIG. 8) to the input of the video display terminal 31 which either reproduces this signal itself on the display screen with markers corresponding to the real-life scale of the parameter being monitored, or else reproduces the functional dependence from this parameter of some other parameter or variable being monitored, e.g. the geometry of the elongated object 1, or else the distribution of static and dynamic loads.

Thus, the disclosed method of monitoring the state of an elongated object and the apparatus capable of performing this method provide for remote monitoring of continuous physical and mechanical characteristics of elongated objects in space and time owing to integration in the extended line 3 of transmission of wave energy of the functions of obtaining, primarily processing and transmitting measurement data, without the necessity of positioning along the elongated object 1 a plurality of unsimilar sensors and connection circuits for their interrogation.

Figure 13:
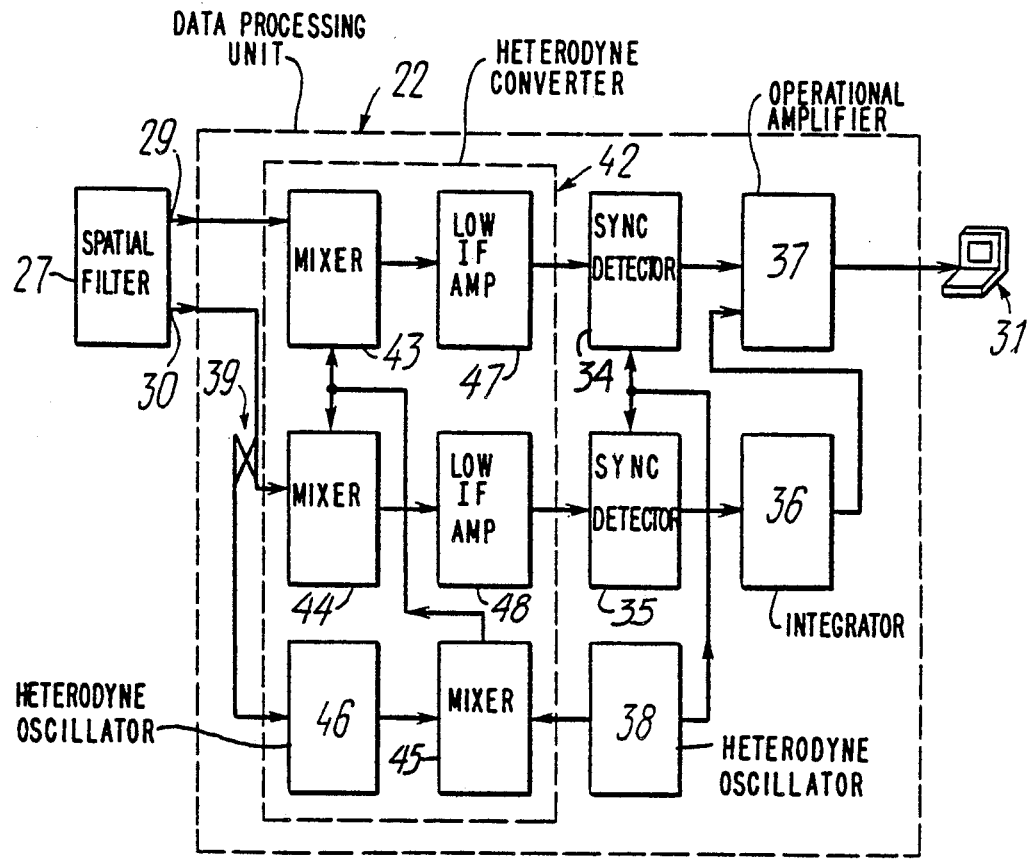
FIG. 13 is a structural block-unit diagram of the data processing unit with the extended line of transmission of wave energy operable in the optical or infra-red wavelength ranges, in accordance with the invention.

To provide for operability of the disclosed apparatus in the optical or infrared ranges, the data processing unit is provided with the heterodyne frequency converter 42 (FIG. 13). In this embodiment, the data processing unit operates, as follows. The reference signal of either visible-light or IR waves is fed from the output 30 of the spatial filter 27 via the directional coupler 39 to the first input of the mixer 44. The measurement signal is fed to the first input of the mixer 43. The fractional energy branched off by the coupler 39 is fed to the input of the heterodyne oscillator 46 to synchronize its oscillations with the reference signal. These oscillations are fed from the output of the heterodyne 46 to the first input of the mixer 45. The other input of the mixer 45 is fed with the i.f. signal (low-frequency) from the output of the heterodyne oscillator 38. Out of the combination frequencies of the reference signal and of the signal of the heterodyne oscillator 38 produced in the mixer 45, there is extracted at the latter's output a single frequency, e.g. the differential beat component. The signal of this component is fed to the respective second inputs of the mixers 43 and 44. The differential beat components are extracted at the outputs of the mixers 43 and 44, of a frequency equalling the intermediate frequency (i.e. the frequency of the heterodyne oscillator 38), and the envelopes of the oscillations is determined by the envelope of the measurement signal at the output of the mixer 43, and by the envelope of the reference signal at the output of the mixer 44. These signals are fed from the outputs of the mixers 43 and 44, respectively, to the inputs of the i.f. amplifiers 47 and 48. The amplified signals are fed from the outputs of the i.f. amplifiers 47 and 48 to the respective first inputs of the synchronous detectors 34 and 35 whose other inputs are fed with the intermediate frequency signal from the second output of the heterodyne oscillator 38, enabling synchronous detection. The rest of the operation of the data processing unit 22 is identical to the abovedescribed operation of the data processing unit 22 of the embodiment illustrated in FIG. 8.

It can be vividly perceived from the above disclosure that the method of monitoring the state of an elongated object and the apparatus for performing this method, in accordance with the present invention, provide for expanding the zone of monitoring an elongated object, as well as the kinds and ranges of monitored parameters, for enhancing the accuracy, promptness and resolution of the monitoring operation, for simplifying the hardware required, for substantially improving the performance characteristics and reducing the energy input.

Industrial Applicability

The invention can be utilized in practically every field of science, engineering and production technologies, wherever the state of elongated objects has to be monitored. Among other possible applications, the present invention can be profitably employed:

in building industry, for construction and maintenance of bridges, high-rise buildings, TV and radio transmission towers, overhead high-voltage power line masts, dams of hydroelectric projects, docking and mooring facilities, offshore dams and weirs, floors and ceilings, underground passes and tunnels;

in general, automotive and aircraft engineering, in shipbuilding for checking and monitoring the strained or deformed state of elongated shells or housings, complicated truss structures, as well as for monitoring the effect of loads upon elongated objects;

in power generating industry for the monitoring and emergency protection of nuclear power plants and power transmission lines; for monitoring heat and electric fields;

in automatic control systems and cybernetic devices for controlling the objects with space-extended parameters, in normal and emergency duties;

in oil-and-gas industry for monitoring operating wells, the strained state of trunk pipelines, for emergency alarm purposes, in operations of suppression of gushing wells by directional drilling;

in mining industry for monitoring the condition and geometry of mine workings and whole mines, for monitoring haulage and conveying systems, and for emergency alarm purposes;

in ferrous and nonferrous industries for monitoring production bays in technologies of ore concentration and metal-melting, in cold-and hot-rolling, and for monitoring the strained and deformed state of rolled stock in the process of its manufacture and in quality control;

in chemical and food industries for monitoring the plant and bays manufacturing materials and final products, transport lines and conveyers; in warning and alarm systems;

in agriculture for monitoring irrigation and amelioration systems and structures, mechanization and automation facilities of grain, fruit and vegetable storages;

in transport and communications for monitoring the state of railway tracks and rolling stock loads, for ensuring traffic safety owing to the introduction of automation and availability of objective data for assessment of traffic situation; for monitoring the state of over- and underpasses, hydraulic and pneumatic pipeline container transport installations, communication transmission lines;

in medicine for monitoring the state or artificial organs, of electric and heat fields of the body surface;

in textile and clothing industries for monitoring the production processes of materials and final products;

in oceanography and meteorology for monitoring diverse variables of the sections of water or gaseous media, of waves and streams, of load fields;

in geology for determining the profiles of surfaces, for monitoring the propagation of seismic waves, for supporting directional drilling and for checking well and borehole parameters, for monitoring the strained and deformed state of towing cables and marine risers in prospecting for offshore oil and mineral deposits, for creating high-precision navigation systems using unidimensional mechanical structures.

Furthermore, the invention can be utilized in standard means for metrological certification of various gauges and measurement devices, and in research and development work for monitoring the distribution of variables and parameters of an object under investigation, with high precision and resolution with respect to both space and time.

The following variables and parameters of elongated objects can be monitored:

curvature flexure and twisting of an elongated structural object;

coordinates of predetermined poits with respect to a selected reference system;

variation of the length of a structure due to extending and compressing forces;

residual flexural, tensile, compression, twisting deformation attesting to the fatigue of a material of an elongated structural object;

variation of the cross-sectional shape of an elongated object;

distribution of vibrations along an elongated object;

external forces (static pressure, dynamic wind or hydrodynamic load); and other variables.

We claim:

1. A method of monitoring the state of an elongated object, comprising the steps of selecting an element responsive to variation of a parameter being monitored representative of the state of an elongated object (1), selecting an extended line (3) of transmission of wave energy capable of carrying the information on variation of the monitored parameter representative of the state of the elongated object (1), integrating said selected responsive element in said extended line (3) of transmission of wave energy, locating said integrated responsive element and extended line (3) of transmission of wave energy in the zone of monitoring on a predetermined coordinate (S), along which the monitored parameter representative of the state of the elongated object (1) tends to vary, shaping and feeding, to the input of the extended line (3) of transmission of wave energy, a time-modulated reference signal transformable in the course of propagation along said line (3) in accordance with variation of the monitored parameter representative of the state of the elongated object (1), measuring the parameters of the converted reference signal at the output of the extended line (3) of transmission of wave energy, and determining the physical and mechanical characteristics of the state of the elongated object (1) on the predetermined coordinate (S), along which the monitored parameter tends to vary, in accordance with the measured parameters of the converted reference signal, which comprises the additional steps of selecting the extended line (3) of transmission of wave energy, providing for propagation of signals therein in the form of modes with known-space- and time-dependent patterns of physical fields, providing in the extended line (3) of transmission of wave energy at least one reference channel (13) and at least one measurement channel (14) with known decelerations of the phase velocities of the modes in each said channel, providing for directional interaction along the extended line (3) of transmission of wave energy in the fields of the modes in at least one reference channel (13) and in at least one measurement channel (14), depending on variation of the monitored parameter, for obtaining in the measurement channel (14) a signal varying in the course of propagation of the signal in the reference channel (13) in accordance with variation of the monitored parameter representative of the state of the elongated object (1), shaping said time-modulated reference signal in the form of time-modulated oscillation of physical fields and converting this oscillation into a signal with a predetermined spatial pattern of the fields of the modes, converting the fields of the modes at the outputs of at least one reference channel and at least one measurement channel (14) of the extended line (3) of transmission of wave energy into exclusively time-dependent electric signals for determining the physical and mechanical characteristics of the state of the elongated object (1) on the predetermined coordinate (S), along which the monitored parameter tends to vary, extracting the amplitude of the electric signal at the output of the reference channel (13), amplifying the electric signal at the output of the measuring channel (14) in inverse proportion to the value of the amplitude of the electric signal at the output of the reference channel (13), and employing linear scale transformation relating the value of the differential of decelerations of the phase velocities of the modes in the reference channel (13) and in the measurement channel (14) of the extended line (3) of transmission of wave energy to the current time of monitoring and the count of the dimension of the coordinate (S) along the extended line (3) of transmission of wave energy.

2. A method of monitoring the state of an elongated object as claimed in claim 1, comprising the step of selecting the extended line (3) of transmission of wave energy, providing for propagation therein of the modes of acoustic or electromagnetic or optical fields in the corresponding wavelength ranges.

3. A method of monitoring the state of an elongated object as claimed in claims 1 or 2, which, for expanding the dynamic range of measurements of the monitored parameter towards the area of its minimum values, comprises the steps of providing, in the extended line (3) of transmission of wave energy, at least one reference channel (13) and at least one measurement channel (14) with one and the same deceleration of the phase velocities of the modes therein, dividing the extended line (3) of transmission of wave energy longitudinally into portions, providing for constant delay in time of the signal in one of the channels (13, 14), and measuring the integral value of the monitored parameter within the selected portions.

4. A method of monitoring the state of an elongated object as claimed in claims 1 or 2, wherein, in providing for directional interaction longitudinally of the extended line (3) of transmission of wave energy of the fields of the modes in at least one reference channel (13) and in at least one measurement channel (14) for measuring the distribution of the monitored parameter, at least one measurement channel (14) is made to have magnetic permeability or dielectric permittivity, acoustic density or optical density functionally dependent on variation of the value of said monitored parameter.

5. A method of monitoring the state of an elongated object as claimed in anyone of claims 1 through 4, wherein the monitored parameter is selected from a group including temperature, pressure, humidity, density, salinity and combinations thereof.

6. An apparatus for monitoring the state of an elongated object, comprising a source (21) of modulated wave energy, adapted for shaping a reference signal varying in time, an extended line (3) of transmission of wave energy, situated in the zone of monitoring the elongated object (1) on a predetermined coordinate (S), adapted for receiving and transmitting information on variation of a monitored parameter and connected to the output of the source (21) of modulated wave energy, a data processing unit (22) adapted for extracting from the extended line (3) of transmission of wave energy the reference signal transformed by said line (3) and for determining the physical and mechanical characteristics of the elongated object (1), said unit being connected with the extended line (3) of transmission of wave energy, and a video display terminal (31) for presenting the obtained physical and mechanical characteristics of the elongated object and having its input connected to the output of the data processing unit (22), wherein the extended line (3) of transmission of wave energy includes a multimode waveguide with at least one reference channel (13) and at least one measurement channel (14) with the coupling therebetween depending on variation of the monitored parameter, the source (21) of modulated wave energy comprises a modulator (33) and a generator (32) of wave energy of physical fields, said modulator and said generator being connected in series, while the apparatus for monitoring the state of an elongated object includes a first spatial filter (23) adapted for exciting a modulated signal in said reference channel of a predetermined space- and time-related pattern of the fields of the modes and connected between the output of the generator (32) of wave energy of physical fields and the extended line (3) of transmission of wave energy, and a second spatial filter (27) adapted for separating in space the fields of the modes in the reference channel (13) excited by the reference signal and the fields of the modes in the measurement channel (14) excited owing to the coupling between said channels dependent on variation of a monitored channel, said second spatial filter being connected between the extended line (3) of transmission of wave energy and outputs (29, 30) of the data processing unit (22), the input and output of at least one reference channel (13) being, respectively, a first input (24) and a first output (29) of wave energy of the fields of the first and second spatial filters (23, 27), while the input and output of at least one measurement channel (14) are, respectively, a second input (25) and a second output (30) of wave energy of the fields of the first and second spatial filters (23, 27).

7. An apparatus for monitoring the state of an elongated object as claimed in claim 6, wherein the data processing unit (22) comprises synchronous detectors (34, 35) adapted for converting the wave energy of fields into electric signals, first inputs of said detectors being connected, respectively, to the outputs of the wave energy of fields of the spatial filter (27), an integrator (36), an operational amplifier (37) whose first input is connected to the output of the integrator (36), while the input of the integrator (36) is connected to the output of the synchronous detector (35), the output of the operational amplifier (37) being the output of the data processing unit (22), the second input of said operational amplifier being connected to the output of the synchronous detector (34), and a heterodyne oscillator (38) whose output is connected to the second inputs of the synchronous detectors (34, 35).

8. An apparatus for monitoring the state of an elongated object as claimed in claim 7, wherein, for providing operability of the apparatus in the optical or infrared ranges of wavelength, the data processing unit (22) includes a heterodyne converter (12) for decreasing the frequency of the carrier oscillations of the wave energy, first and second inputs of which are the inputs of the data processing unit (22), while its outputs are connected to the inputs of the synchronous detectors (34, 35), a third input thereof being connected to an additional output of the heterodyne oscillator (38).

* * * * *